US011912308B2

(12) United States Patent
Sakurada et al.

(10) Patent No.: US 11,912,308 B2
(45) Date of Patent: Feb. 27, 2024

(54) AUTONOMOUS VEHICLE, PASSENGER VEHICLE, AND VEHICLE TRANSFER SYSTEM

(71) Applicant: TOYOTA JIDOSHA KABUSHIKI KAISHA, Aichi-ken (JP)

(72) Inventors: Shin Sakurada, Toyota (JP); Katsuya Hoshi, Nisshin (JP); Hiroaki Sugiyama, Nagoya (JP); Masahisa Sawada, Nagoya (JP); Hiroyuki Ito, Kariya (JP); Makoto Segi, Kariya (JP); Hiroki Hattori, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 65 days.

(21) Appl. No.: 17/557,048

(22) Filed: Dec. 21, 2021

(65) Prior Publication Data
US 2022/0281481 A1 Sep. 8, 2022

(30) Foreign Application Priority Data

Mar. 2, 2021 (JP) .................................. 2021-032324

(51) Int. Cl.
*B60W 60/00* (2020.01)
*B60W 10/20* (2006.01)
(Continued)

(52) U.S. Cl.
CPC .......... *B60W 60/0025* (2020.02); *B60J 5/062* (2013.01); *B60W 10/20* (2013.01);
(Continued)

(58) Field of Classification Search
CPC .. B60W 60/0025; B60W 10/20; B60W 10/22; B60W 2554/80; B60W 2710/22; B60J 5/062; B60R 21/026
(Continued)

(56) References Cited

U.S. PATENT DOCUMENTS 9,527,394 B1 * 12/2016 Tang ...................... B60W 10/26
2009/0320713 A1 * 12/2009 Amiri .................... B62D 55/06
280/1
(Continued)

FOREIGN PATENT DOCUMENTS

CN 111746675 A 10/2020
DE 102017215564 A1 3/2019
(Continued)

OTHER PUBLICATIONS

Yen-Long et al., "Real-time Transfers for Improving Efficiency of Ridesharing Services in the Environment with Connected and Self-driving Vehicles," 2020, Publisher: IEEE.*

Primary Examiner — Tuan C To
(74) Attorney, Agent, or Firm — HAUPTMAN HAM, LLP

(57) ABSTRACT

An autonomous vehicle allows passengers to transfer from a passenger vehicle, which is a relatively large vehicle, to the autonomous vehicle. The autonomous vehicle is provided with an autonomous travel control unit (steering control unit) configured to, when the passenger vehicle is stopped, cause the autonomous vehicle to pull up alongside the passenger vehicle such that an entrance (second entrance) of the autonomous vehicle is placed next to an entrance (first entrance) of the passenger vehicle.

13 Claims, 22 Drawing Sheets

(51) Int. Cl.
  *B60W 10/22* (2006.01)
  *B60J 5/06* (2006.01)
(52) U.S. Cl.
  CPC ......... *B60W 10/22* (2013.01); *B60W 2554/80* (2020.02); *B60W 2710/22* (2013.01)
(58) Field of Classification Search
  USPC .......................................................... 701/23
  See application file for complete search history.

(56) References Cited

U.S. PATENT DOCUMENTS

| | | | | |
|---|---|---|---|---|
| 2010/0228386 | A1* | 9/2010 | Kharkover | B65G 1/0478 |
| | | | | 700/218 |
| 2015/0151641 | A1* | 6/2015 | Berger | B62D 15/0285 |
| | | | | 320/108 |
| 2018/0281657 | A1* | 10/2018 | Healey | G06Q 10/08 |
| 2019/0057209 | A1* | 2/2019 | Dyer | H04L 9/3228 |
| 2019/0119970 | A1* | 4/2019 | Erlacher | G06V 40/103 |
| 2020/0012971 | A1* | 1/2020 | Chouinard | G06Q 10/02 |
| 2020/0094645 | A1* | 3/2020 | Edren | B60G 17/0525 |
| 2020/0209878 | A1* | 7/2020 | Shoda | B60W 10/20 |
| 2020/0310457 | A1* | 10/2020 | Hara | G06V 20/56 |
| 2020/0317225 | A1* | 10/2020 | Metzner | G05D 1/0214 |
| 2020/0406915 | A1* | 12/2020 | Yamanouchi | B60K 35/00 |
| 2021/0012253 | A1* | 1/2021 | Heyl | G08G 1/01 |
| 2021/0027624 | A1* | 1/2021 | Oberdanner | H04W 4/38 |
| 2022/0371631 | A1* | 11/2022 | Armocida | B60P 3/08 |

FOREIGN PATENT DOCUMENTS

| | | | | |
|---|---|---|---|---|
| EP | 3355028 A1 | * | 8/2018 | ......... G01C 21/3438 |
| GB | 2582899 A | * | 10/2020 | ........... B60G 17/017 |
| JP | H10278533 A | | 10/1998 | |
| JP | 2017-171067 A | | 9/2017 | |
| JP | 2018-094956 A | | 6/2018 | |
| JP | 2021-026439 A | | 2/2021 | |
| WO | WO-9809861 A1 | * | 3/1998 | ............. B60L 50/50 |

\* cited by examiner

FIG. 15

BUS IN OPERATION NO. 1

BUS STOP: A4 EXPECTED ARRIVAL TIME: ＊＊：＊＊
BUS STOP: A3 EXPECTED ARRIVAL TIME: ＊＊：＊＊
BUS STOP: A2 EXPECTED ARRIVAL TIME: ＊＊：＊＊
BUS STOP: A1 EXPECTED ARRIVAL TIME: ＊＊：＊＊

| ORDER | IN-VEHICLE TERMINAL ID | AUTONOMOUS VEHICLE ID | LICENSE PLATE NUMBER | VEHICLE COLOR |
|---|---|---|---|---|
| 1 | ＊＊＊＊ | ＊＊＊－＊＊＊ | ＊－＊＊＊＊ | ＊＊ |
| 2 | ＊＊＊＊ | ＊＊＊－＊＊＊ | ＊－＊＊＊＊ | ＊＊ |
| 3 | ＊＊＊＊ | ＊＊＊－＊＊＊ | ＊－＊＊＊＊ | ＊＊ |
| ⋮ | ⋮ | ⋮ | ⋮ | ⋮ |

BUS IN OPERATION NO. 2

BUS STOP: A4 EXPECTED ARRIVAL TIME: ＊＊：＊＊
BUS STOP: A3 EXPECTED ARRIVAL TIME: ＊＊：＊＊
BUS STOP: A2 EXPECTED ARRIVAL TIME: ＊＊：＊＊
BUS STOP: A1 EXPECTED ARRIVAL TIME: ＊＊：＊＊

| ORDER | IN-VEHICLE TERMINAL ID | AUTONOMOUS VEHICLE ID | LICENSE PLATE NUMBER | VEHICLE COLOR |
|---|---|---|---|---|
| 1 | ＊＊＊＊ | ＊＊＊－＊＊＊ | ＊－＊＊＊＊ | ＊＊ |
| 2 | ＊＊＊＊ | ＊＊＊－＊＊＊ | ＊－＊＊＊＊ | ＊＊ |
| 3 | ＊＊＊＊ | ＊＊＊－＊＊＊ | ＊－＊＊＊＊ | ＊＊ |
| ⋮ | ⋮ | ⋮ | ⋮ | ⋮ |

AUTONOMOUS VEHICLE, PASSENGER VEHICLE, AND VEHICLE TRANSFER SYSTEM

CROSS-REFERENCE TO RELATED APPLICATION

This application claims priority to Japanese Patent Application No. 2021-032324 filed on Mar. 2, 2021, incorporated herein by reference in its entirety.

BACKGROUND

1. Technical Field

The present specification discloses an autonomous vehicle, a passenger vehicle, and a vehicle transfer system including the same vehicles.

2. Description of Related Art

A passenger vehicle travels on a predetermined service route and picks up passengers at a bus stop installed along the service route. For example, Japanese Unexamined Patent Application Publication No. 10-278533 discloses that, when a bus, which is a passenger vehicle, stops at a bus stop, a vehicle height of the bus is lowered to a level difference between the bus and the sidewalk.

SUMMARY

The present specification discloses an autonomous vehicle, a passenger vehicle, and a vehicle transfer system, each of which is capable of improving a mobility service after passengers alight from the passenger vehicle.

An autonomous vehicle disclosed in the present specification is a relatively small vehicle, to which passengers can transfer from a relatively large vehicle. The autonomous vehicle includes a steering control unit configured to, when the large vehicle is stopped, cause the autonomous vehicle to pull up alongside the large vehicle such that a second entrance of the autonomous vehicle is placed next to a first entrance of the large vehicle.

With the configuration stated above, it is possible to reduce the burden placed on the passengers when they have to wait for the autonomous vehicle at a bus stop after alighting from the large vehicle, when transferring from the large vehicle to the autonomous vehicle.

In the configuration stated above, the autonomous vehicle may include a ranging unit configured to measure a distance between the autonomous vehicle and an object around the autonomous vehicle. In such as case, the steering control unit may control a steering mechanism such that an offset distance between the first entrance and the second entrance, which is measured by the ranging unit, falls within a predetermined proximity region.

With the configuration stated above, the autonomous vehicle can pull up alongside the large vehicle regardless of whether communication is established with a remote management device, while the autonomous vehicle has to receive a steering instruction from the management device to pull up alongside the large vehicle.

In the configuration stated above, the autonomous vehicle may further include a suspension mechanism configured to adjust a vehicle height, and a vehicle height control unit configured to control the suspension mechanism. In such a case, the vehicle height control unit may control, when the autonomous vehicle pulls up alongside the large vehicle, the suspension mechanism such that a floor surface of the second entrance is at the same level as a floor surface of the first entrance.

With the configuration stated above, a level difference between the floor surfaces of the entrances facing each other is removed, and the passengers can smoothly transfer.

Further, a passenger vehicle disclosed in the present specification travels on a predetermined service route and allows passengers to board and alight from the passenger vehicle at a bus stop installed on the service route. The passenger vehicle includes a passenger entrance provided on a first side wall facing a platform provided at the bus stop. The passenger vehicle also includes a transfer entrance provided on a second side wall facing a roadway and opposite to the first side wall, through which the passengers transfer to an autonomous vehicle when the autonomous vehicle pulls up alongside the passenger vehicle.

With the configuration stated above, it is possible to independently separate the passengers boarding the passenger vehicle at the platform and the passengers transferring to the autonomous vehicle. Further, the autonomous vehicle allows the passengers to transfer from the passenger vehicle without entering a parking lot or a sidewalk other than the roadway, as the transfer entrance is provided on the roadway side.

Moreover, a vehicle transfer system disclosed in the present specification includes an autonomous vehicle and a passenger vehicle. The passenger vehicle travels on a predetermined service route and allows passengers to board and alight from the passenger vehicle at a bus stop installed on the service route. The autonomous vehicle allows the passengers to transfer from the passenger vehicle to the autonomous vehicle. The passenger vehicle includes a passenger entrance provided on a first side wall facing a platform provided at the bus stop. Further, the passenger vehicle also includes a transfer entrance provided on a second side wall facing a roadway and opposite to the first side wall, through which the passengers transfer to the autonomous vehicle. The autonomous vehicle includes an entrance provided on a side wall on the same side as the first side wall of the passenger vehicle. Moreover, the autonomous vehicle includes a steering control unit configured to, when the passenger vehicle is stopped at the bus stop, cause the autonomous vehicle to pull up alongside the passenger vehicle such that the entrance of the autonomous vehicle is placed next to the transfer entrance of the passenger vehicle.

Further, sliding doors may be installed at the transfer entrance of the passenger vehicle and the entrance of the autonomous vehicle, each of which moves forward and backward in a front-back direction of the vehicle in the configuration stated above.

With the configuration stated above, as doors of the entrances facing each other are each sliding doors, the entrances can be brought closer to each other than when swing doors are used.

The autonomous vehicle may further include a suspension mechanism configured to adjust the vehicle height, and a vehicle height control unit configured to control the suspension mechanism in the configuration stated above. In such a case, the vehicle height control unit may control, when the autonomous vehicle pulls up alongside the passenger vehicle, the suspension mechanism such that a floor surface of the entrance of the autonomous vehicle is at the same level as a floor surface of the transfer entrance of the passenger vehicle.

The autonomous vehicle, the passenger vehicle, and the vehicle transfer system are capable of an improving mobility service after the passengers alight from the passenger vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 15 is a diagram illustrating a vehicle dispatch schedule;

DETAILED DESCRIPTION OF EMBODIMENTS

Figure 1:
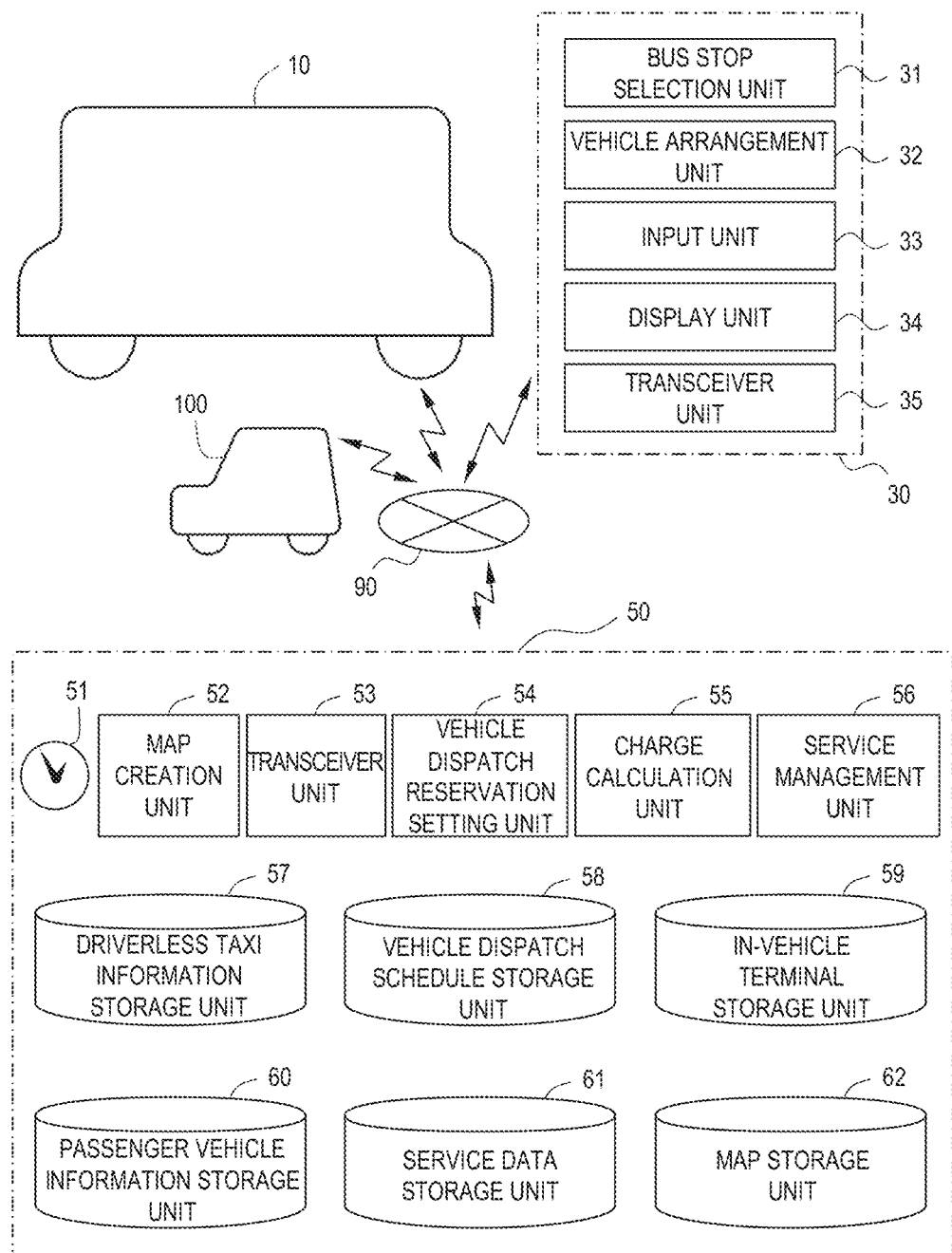
FIG. 1 is a functional block diagram illustrating one example of a vehicle dispatch system of an autonomous vehicle according to the present embodiment.

Hereinafter, embodiments of the present disclosure will be described with reference to drawings. Shapes, materials, numbers, and numerical values described below are mere examples for illustration and can be appropriately modified or changed according to the specifications of the passenger vehicle, the autonomous vehicle, and the vehicle transfer system. The same reference numerals are given to equivalent elements in all drawings hereinbelow.

Overall Configuration

FIG. 1 is a diagram illustrating one example of the overall configuration of a vehicle management system according to the present embodiment. This system includes a passenger vehicle 10, an in-vehicle terminal 30, a management device 50, and an autonomous vehicle 100. The passenger vehicle 10, the in-vehicle terminal 30, the management device 50, and the autonomous vehicle 100 can communicate with each other using a communication system such as the Internet 90.

Figure 2:
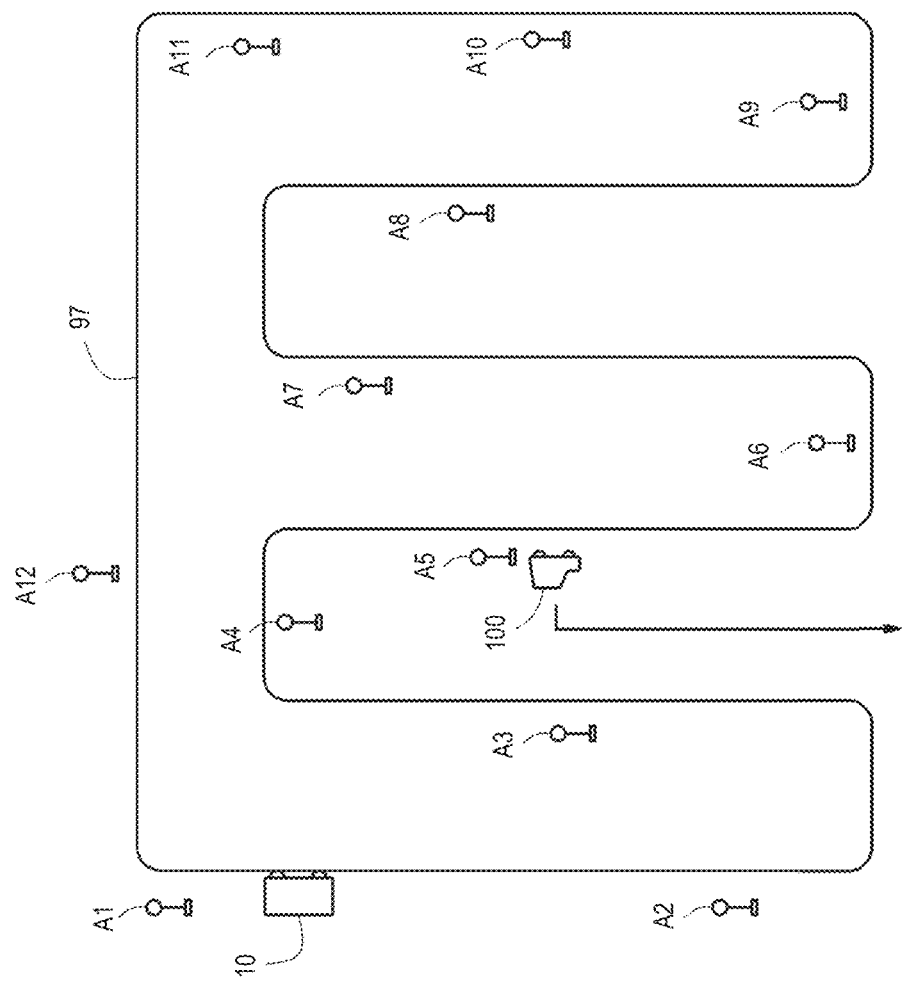
FIG. 2 is a diagram illustrating a difference in travel modes between a passenger vehicle and the autonomous vehicle according to the present embodiment.

In the vehicle management system according to the present embodiment, the passenger vehicle 10 is used as a passenger-carrying bus, and the autonomous vehicle 100 is used as a driverless taxi. For example, as shown in FIG. 2, the passenger vehicle 10 autonomously travels on a predetermined service route 97. Further, the passenger vehicle 10 stops at a plurality of bus stops A1 to A12 installed on the service route 97.

Figure 3:
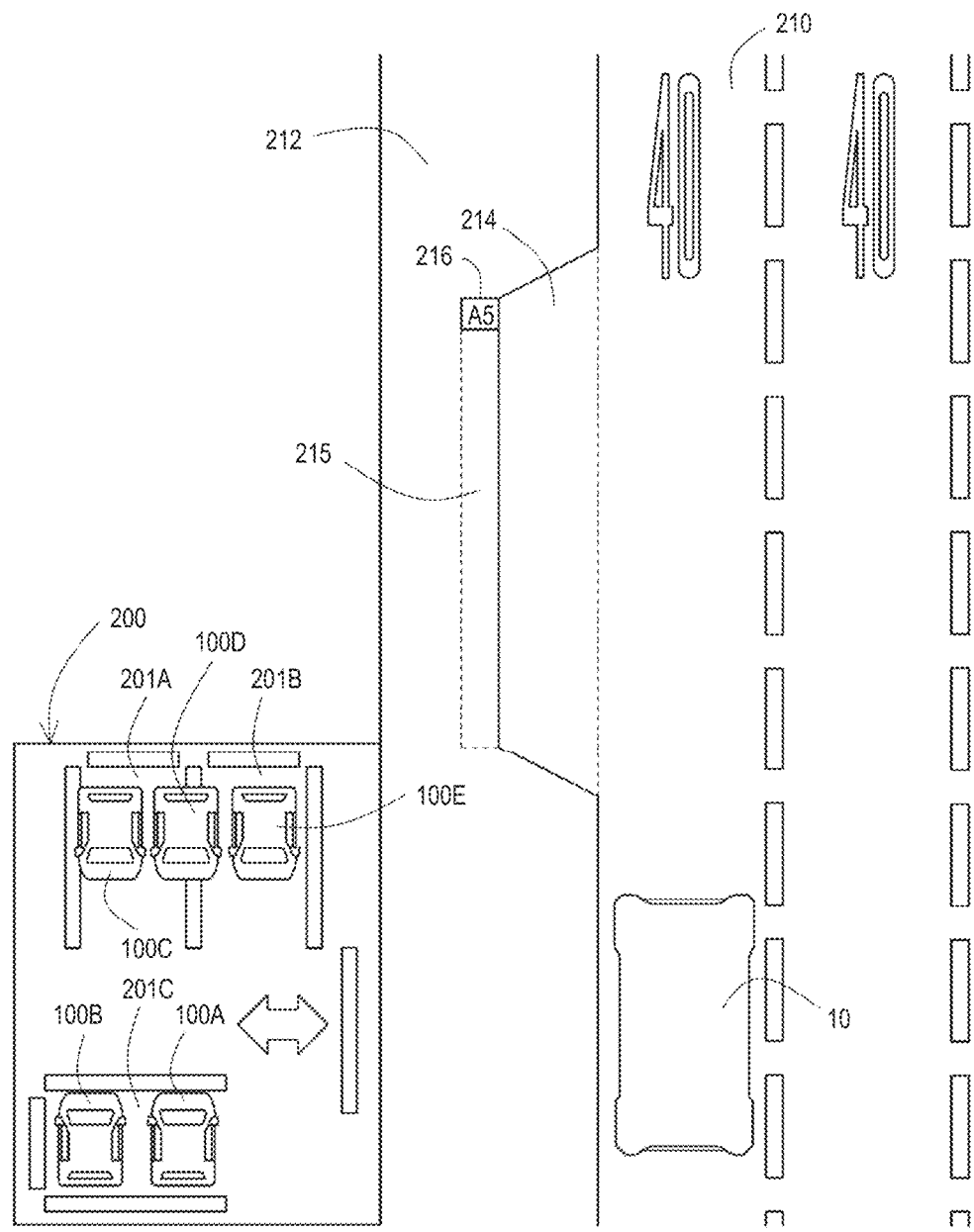
FIG. 3 is a plan view illustrating a bus stop and its surroundings.

FIG. 3 is a plan view illustrating the bus stop and its surroundings. The bus stop includes a stop spot 214, a sign 216 (bus stop sign), and a platform 215. For example, the stop spot 214 is a so-called bus turnout, and is formed by expanding a roadway 210 and cutting out a part of a sidewalk 212. The sign 216 and the platform 215 are provided so as to face the stop spot 214 in a cut-out area of the sidewalk 212. When the passenger vehicle 10 stops in the stop spot 214, the passengers waiting at the platform 215 board the passenger vehicle 10. Further, the passengers on the passenger vehicle 10 alight from the passenger vehicle 10 at the platform 215.

Referring to FIG. 2, the autonomous vehicle 100 autonomously travels to a destination set by the passenger. For example, the passenger alights from the passenger vehicle 10 at any of the bus stops A1 to A12 and boards the autonomous vehicle 100 to move to the destination far away from the service route 97.

As described in detail below, the passenger on the passenger vehicle 10 operates the in-vehicle terminal 30 to make a vehicle dispatch reservation for transferring to the autonomous vehicle 100 at any of the bus stops A1 to A12 that the passenger will get off in this vehicle management system. The management device 50 receives information on vehicle dispatch reservation. The management device 50 arranges the autonomous vehicle 100 and causes the autonomous vehicle 100 to stand by at a waiting place near one of the bus stops A1 to A12 that the passenger will alight from the passenger vehicle at.

For example, referring to FIG. 3, a parking lot 200, which is the waiting place where the reserved autonomous vehicles 100A to 100E are waiting, is installed in the vicinity of the bus stop. As will be described later, when the passenger vehicle 10 carrying the passenger who has made the vehicle dispatch reservation arrives at one of the bus stops A1 to A12 where the passenger vehicle 10 will drop off such a passenger, the autonomous vehicle 100 waiting at the parking lot 200 moves to pull up alongside the passenger vehicle 10. At this time, the autonomous vehicle 100 pulls up next to the passenger vehicle 10 on a side opposite to a side facing the platform 215. Further, the passenger vehicle 10 and the autonomous vehicle 100 open their respective entrances to allow the passenger who has made the vehicle dispatch reservation to transfer from the passenger vehicle 10 to the autonomous vehicle 100.

Passenger Vehicle

Figure 4:
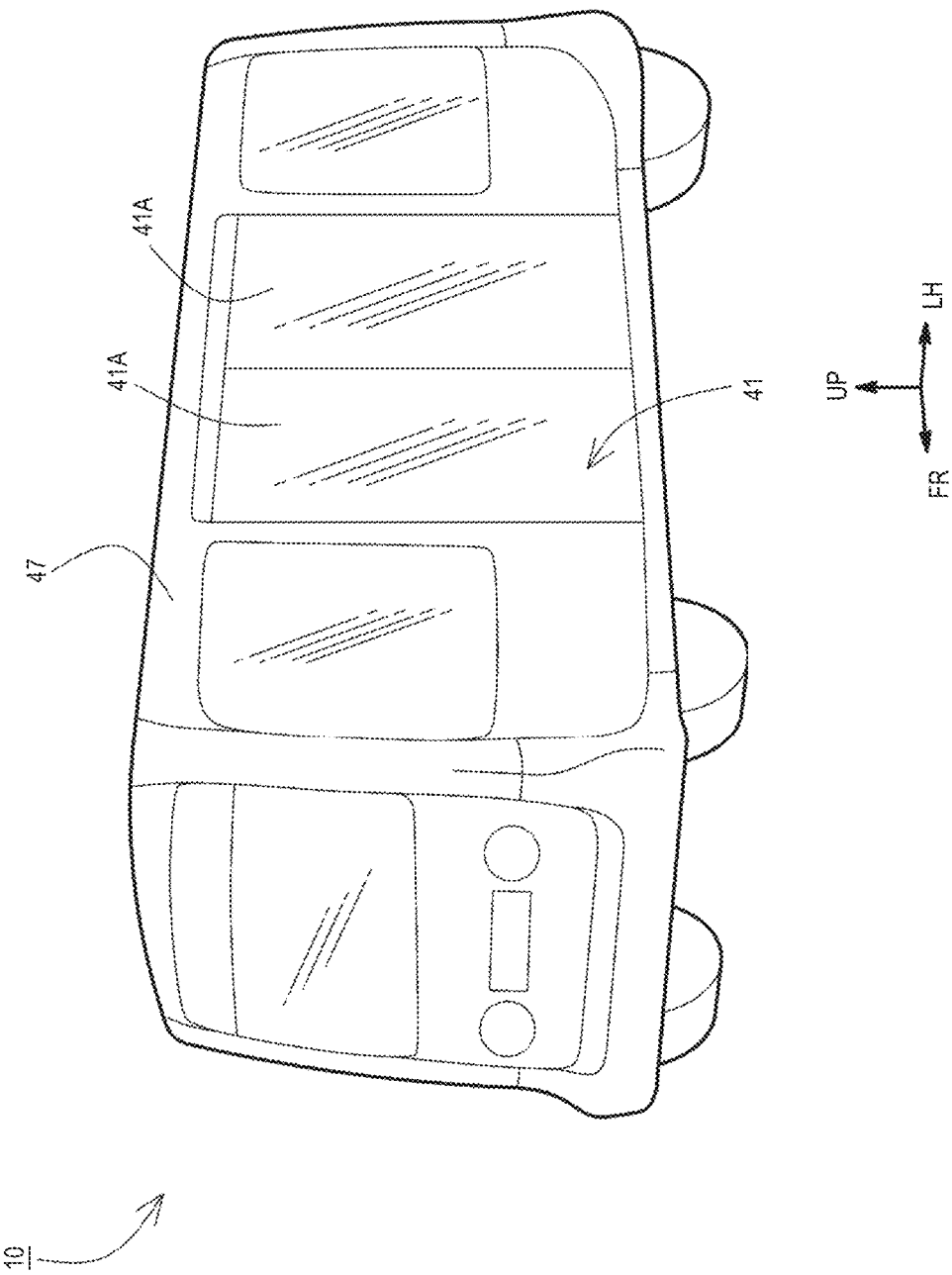
FIG. 4 is a perspective view illustrating an appearance of the passenger vehicle according to the present embodiment from a front side.
Figure 5:
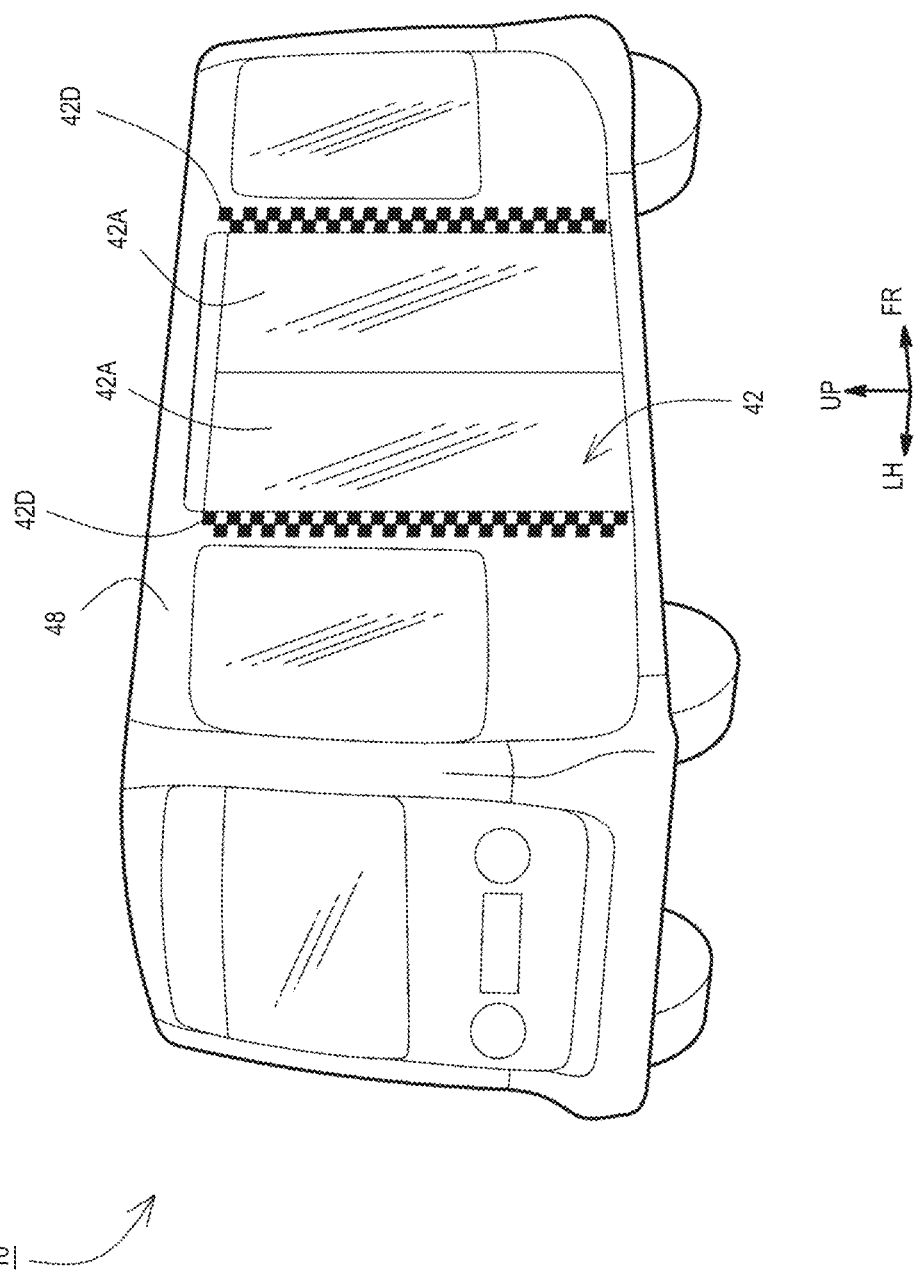
FIG. 5 is a perspective view illustrating an appearance of the passenger vehicle according to the present embodiment from a rear side.
Figure 6:
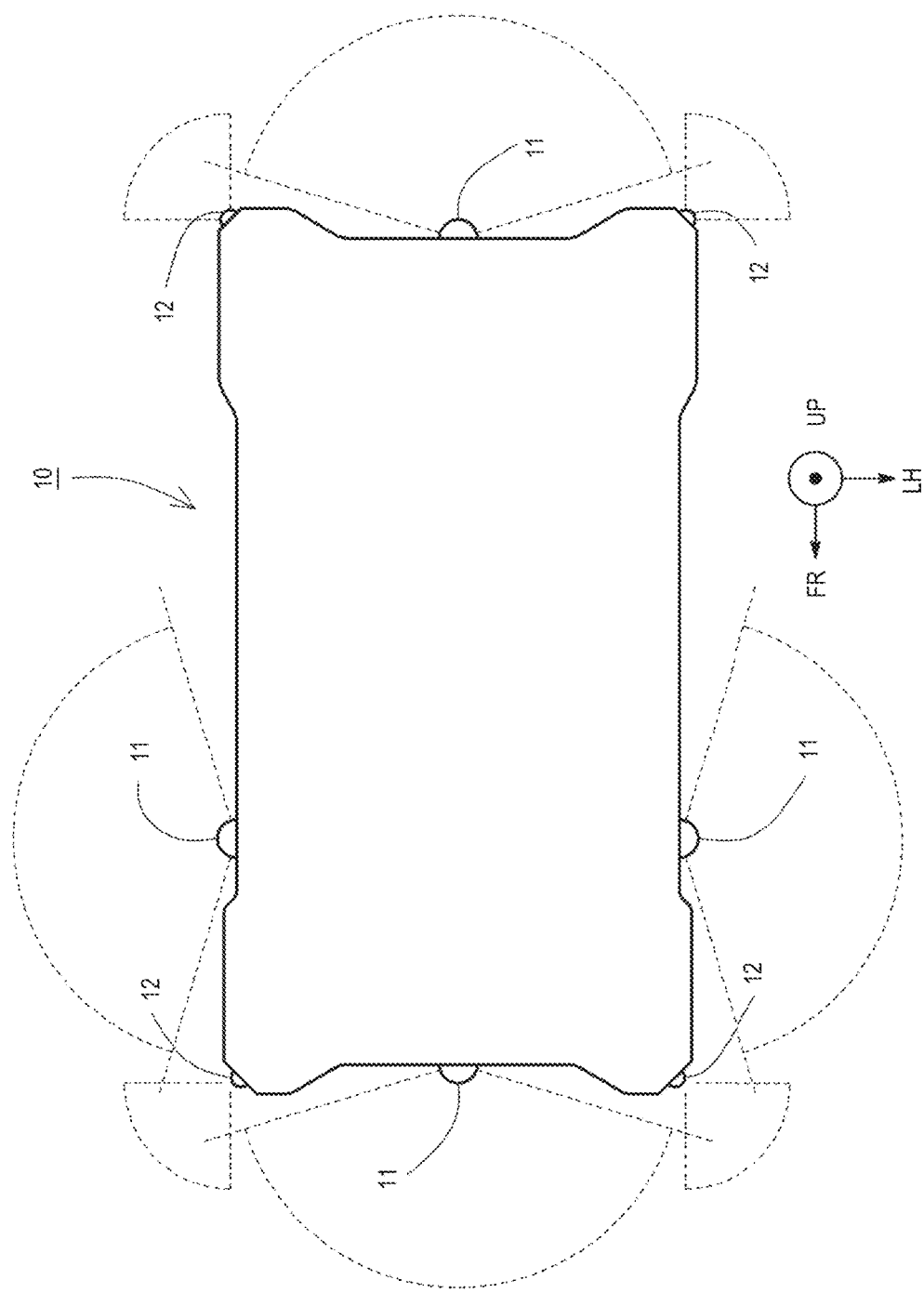
FIG. 6 is a plan view illustrating a sensor arrangement of the passenger vehicle according to the present embodiment.

FIGS. 4 to 9 are diagrams illustrating a structure of the passenger vehicle 10. Referring to FIGS. 4 to 6, a front-back direction of the vehicle is indicated by the axis marked with a symbol FR, and a vehicle width direction is indicated by the axis marked with a symbol left hand (LH). Further, a vehicle height direction is indicated by the axis marked with a symbol UP.

FIG. 4 is a perspective view illustrating appearances of the passenger vehicle 10 viewed from a front side and a left side. FIG. 5 is a perspective view illustrating appearances of the passenger vehicle 10 viewed from a rear side and a right side. The passenger vehicle 10 is relatively larger than the autonomous vehicle 100. As is apparent from the appearances shown in FIGS. 4 and 5, the passenger vehicle 10 is symmetrical in the front-back direction.

The passenger vehicle 10 is, for example, an autonomous vehicle having an automatic driving function. For example, based on the levels of driving automation defined by the Society of Automotive Engineers (SAE), the passenger vehicle 10 may switch its SAE level within the range of 0 (fully manual) to 5 (fully autonomous). For example, when the passenger vehicle 10 is in operation, the level of driving automation is set to 4 or 5.

The passenger vehicle 10 is used as a passenger-carrying bus that carries the passengers in a vehicle compartment while autonomously traveling on the predetermined service route 97 (refer to FIG. 2). Further, the passenger vehicle 10 picks up the passengers at the plurality of bus stops A1 to A12 installed on the service route 97.

Figure 8:
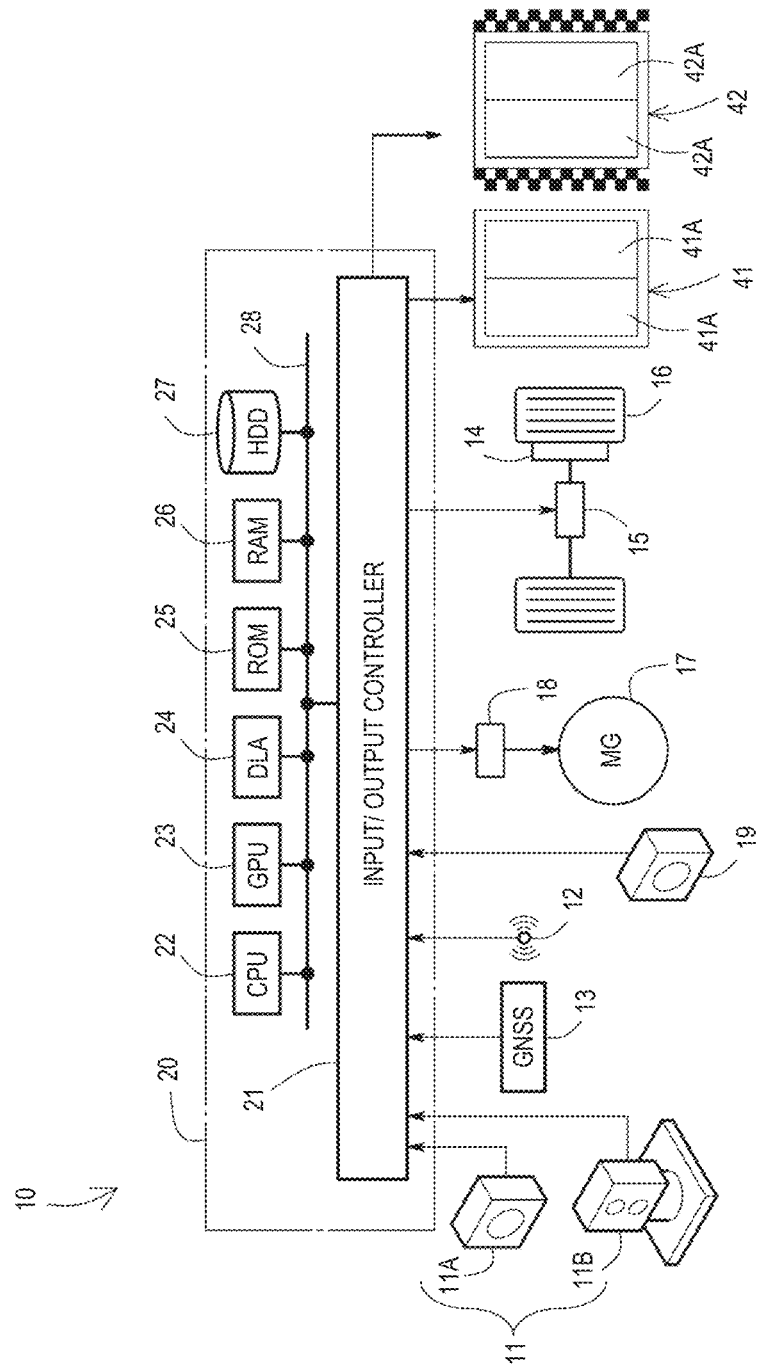
FIG. 8 is a diagram illustrating one example of a hardware configuration of the passenger vehicle according to the present embodiment.
Figure 9:
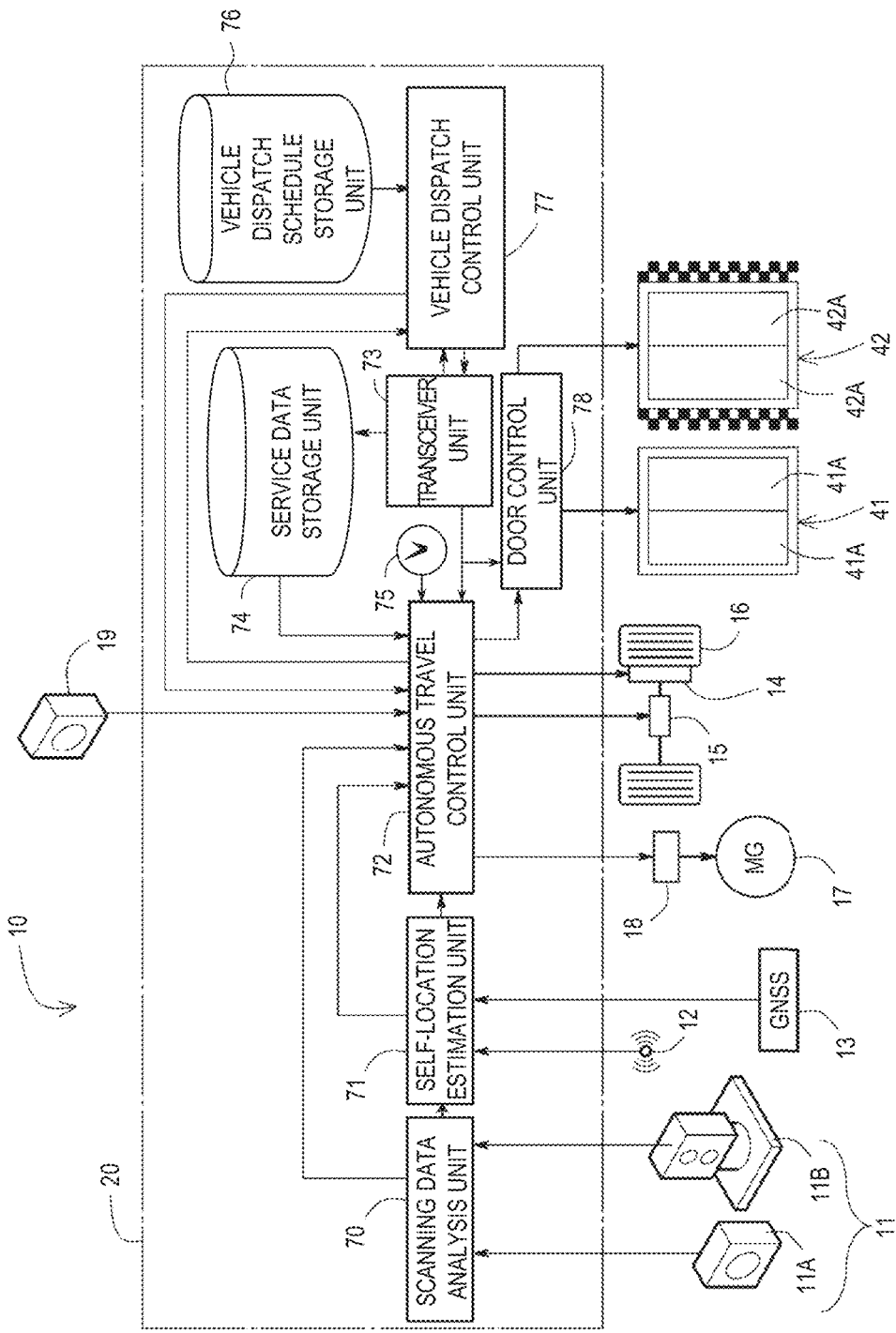
FIG. 9 is a diagram illustrating one example of functional blocks of the passenger vehicle according to the present embodiment.

FIGS. 8 and 9 are diagrams illustrating an automatic driving mechanism of the passenger vehicle 10. The passenger vehicle 10 is an electric vehicle that uses a rotating electrical machine 17 (motor) as a drive source and a battery (not shown) as a power source. Further, the passenger vehicle 10 includes a steering mechanism 15 for steering wheels 16 and a braking mechanism 14 for braking the wheels 16 as a travel control mechanism. Moreover, the passenger vehicle 10 includes an inverter 18 that controls output of the rotating electrical machine 17.

The passenger vehicle 10 includes an outside camera 11A, a LiDAR unit 11B, a proximity sensor 12, a positioning unit 13, and a control unit 20 as a mechanism for acquiring its location and confirming a surrounding situation.

Referring to FIG. 6, the passenger vehicle 10 is provided with sensor units 11 on a front surface, a rear surface, and both side surfaces thereof. The sensor unit 11 includes the outside camera 11A (refer to FIG. 8) and the LiDAR unit 11B.

The LiDAR unit 11B is a sensor unit for automatic driving, and is a ranging unit configured to measure a distance between the vehicle and an object around the vehicle. The LiDAR unit 11B is based on Light Detection and Ranging (LiDAR), i.e., a method for determining a distance to a peripheral object using a laser. The LiDAR unit 11B includes an emitter that irradiates an infrared laser beam toward the outside of the vehicle, a receiver that receives the reflected light, and a motor that rotates the emitter and the receiver.

For example, the emitter irradiates the infrared laser beam toward the outside of the vehicle. When the laser beam emitted from the emitter hits an object around the passenger vehicle 10, the reflected light is received by the receiver. A distance between a reflected point and the receiver is determined based on the time taken to receive the reflected light emitted from the emitter by the receiver. Further, the emitter and the receiver are rotated by the motor and the laser beam is scanned in a horizontal direction and a vertical direction, whereby three-dimensional point cloud data about a surrounding environment around the passenger vehicle 10 can be acquired.

Returning to FIG. 8, the outside camera 11A captures the same field of view as the LiDAR unit 11B. The outside camera 11A includes an imaging sensor, such as a CMOS sensor or a CCD sensor. The proximity sensor 12 is, for example, an infrared sensor, and a plurality of the proximity sensors are provided at four corners of the passenger vehicle 10 in a plan view as shown in FIG. 6. For example, when the passenger vehicle 10 arrives at the platform, the proximity sensor 12 detects a protrusion such as a curb on the sidewalk. Based on this detection, it is possible to control accurate arrival of the passenger vehicle 10 such that it is brought close to the curb and stopped.

The positioning unit 13 is a system for positioning by an artificial satellite, and for example, a Global Navigation Satellite System (GNSS) is adopted. With the positioning unit 13, it is possible to estimate a location (latitude and longitude) of the vehicle.

The control unit 20 may be, for example, an electronic control unit (ECU) of the passenger vehicle 10, and is configured by a computer (electronic computer). The control unit 20 includes an input/output controller 21 that controls data input/output as its hardware configuration. Further, the control unit 20 includes a CPU 22, a graphics processing unit (GPU) 23, and a deep learning accelerator (DLA) 24 as arithmetic units. The control unit 20 includes a ROM 25, a RAM 26, and a hard disk drive (HDD) 27 as storage units. A storage device such as a solid state drive (SSD) may be used instead of the hard disk drive 27. All these components are connected to an internal bus 28.

A program for executing automatic driving control of the passenger vehicle 10 is stored in at least one of the ROM 25 and the hard disk drive 27, which are the storage devices. When the program is executed by, for example, the CPU 22 of the control unit 20, functional blocks are generated in the control unit 20 as shown in FIG. 9. That is, the control unit 20 includes a scanning data analysis unit 70, a self-location estimation unit 71, an autonomous travel control unit 72, a transceiver unit 73, a service data storage unit 74, a clock 75, a vehicle dispatch schedule storage unit 76, a vehicle dispatch control unit 77, and a door control unit 78, as the functional blocks.

The scanning data analysis unit 70 acquires a captured image taken by the outside camera 11A. The scanning data analysis unit 70 performs image recognition on the acquired image based on a well-known deep learning algorithm such as Single Shot Multibox Detector (SSD) or You Only Look Once (YOLO) using supervised learning. The image recognition allows objects in the captured image to be detected and recognized according to their kinds (vehicle, pedestrian, structure, etc.).

Further, the scanning data analysis unit 70 acquires three-dimensional point cloud data from the LiDAR unit 11B. The scanning data analysis unit 70 executes clustering to divide the three-dimensional point cloud into a plurality of clusters. Further, the scanning data analysis unit 70 creates surrounding data by superimposing coordinates of the captured image subject to the image recognition and the clustered three-dimensional point cloud data. From the surrounding data, it is possible to detect what kind of an object has and how far it is from the passenger vehicle 10. This surrounding data is transmitted to the self-location estimation unit 71 and the autonomous travel control unit 72.

The self-location estimation unit 71 acquires location information (latitude and longitude) of the vehicle from the positioning unit 13. For example, the self-location estimation unit 71 acquires the location information from the artificial satellite. It is known that the location information acquired from the artificial satellite has a maximum degree of error of 100 meters. The self-location estimation unit 71 may modify the location information acquired from the positioning unit 13.

For example, the self-location estimation unit 71 estimates its approximate location from the location information acquired from the artificial satellite, and extracts dynamic map data around the estimated location from the service data storage unit 74. Further, the self-location estimation unit 71 matches a three-dimensional image based on the dynamic map with a surrounding image made by the scanning data analysis unit 70. By the matching, a coordinate point on the dynamic map, i.e., the location of the vehicle is obtained. The location information (location information of the vehicle) obtained thusly is transmitted to the autonomous travel control unit 72.

The transceiver unit 73 has a function of receiving a signal transmitted from the outside to the passenger vehicle 10 and a function of transmitting a signal from the passenger vehicle 10 to the outside. For example, service route map data is transmitted from the management device 50 to the transceiver unit 73. As will be described later, this service route map data includes the dynamic map data. The service route map data received by the transceiver unit 73 is stored in the service data storage unit 74 together with service timetable data.

The autonomous travel control unit 72 performs travel control of the passenger vehicle 10, based on the service route map data stored in the service data storage unit 74, the location information (location information of the autonomous vehicle) transmitted from the self-location estimation unit 71, and the surrounding data transmitted from the scanning data analysis unit 70.

For example, a global course is determined according to the location information and the service route map data. Furthermore, a local course, for example, for avoiding obstacles in front of the vehicle is determined based on the surrounding data. The autonomous travel control unit 72 controls the braking mechanism 14, the steering mechanism 15, and the inverter 18 according to these courses. From this point of view, the autonomous travel control unit 72 has functions of a braking control unit, a steering control unit, and a drive control unit of the rotating electrical machine 17.

The vehicle dispatch schedule storage unit 76 stores a vehicle dispatch schedule as shown in FIG. 15, which will be described later. The vehicle dispatch schedule includes vehicle dispatch reservation information of the autonomous vehicle 100 to which the passengers can transfer from the passenger vehicle 10. The vehicle dispatch schedule is generated by the management device 50. For example, the management device 50 has the embedded vehicle dispatch schedule in which the autonomous vehicle 100 provided at a transfer destination is registered for each of the passenger vehicles 10. The passenger vehicle 10 receives only the vehicle dispatch schedule data assigned thereto from the management device 50.

As will be described later, when the passenger vehicle 10 arrives at one of the stops A1 to A12, the vehicle dispatch control unit 77 requests the autonomous vehicle 100, which is reserved for vehicle dispatch and stands by in the vicinity of the bus stop, to move to pick up the passenger. For example, the vehicle dispatch control unit 77 designates the autonomous vehicles 100 in the order shown in FIG. 15 and requests the vehicle that picks up the passenger.

The door control unit 78 controls opening and closing of entrance doors 41A, as well as transfer doors 42A. When the passenger vehicle 10 stops at the bus stop, the door control unit 78 opens the entrance doors 41A which are in the closed state. Further, when the autonomous vehicle 100 to which the passenger transfers at such a bus stop is reserved for vehicle dispatch in the vehicle dispatch schedule, the door control unit 78 opens the transfer doors 42A in the closed state when the autonomous vehicle 100 pulls up alongside the passenger vehicle 10.

Figure 7:
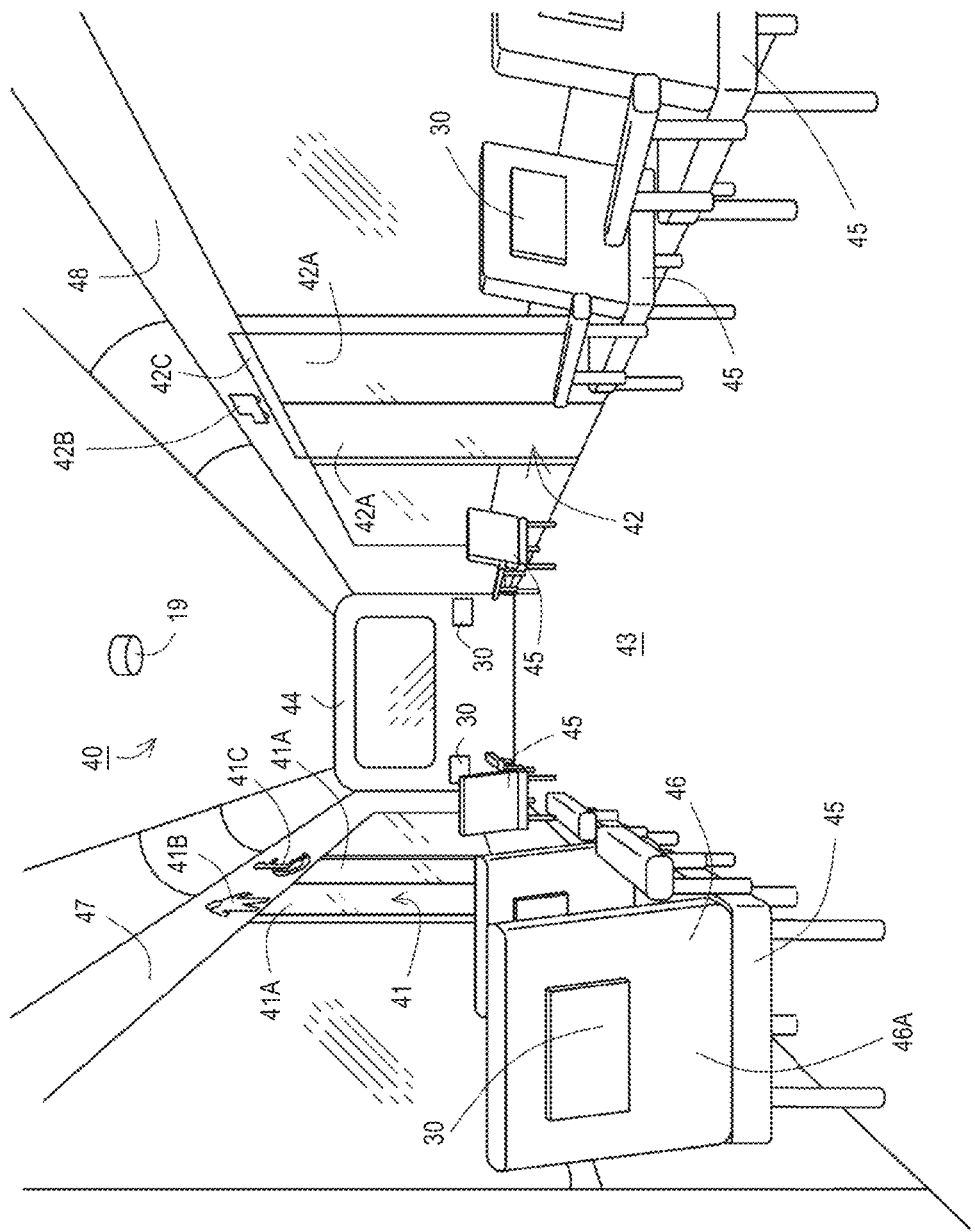
FIG. 7 is a diagram illustrating one example of a vehicle compartment of the passenger vehicle according to the present embodiment.

FIG. 7 is a diagram illustrating a vehicle compartment 40 of the passenger vehicle 10. A plurality of seats 45 are provided in the vehicle compartment 40. For example, the seats 45 are arranged in a row on both sides of the vehicle compartment. The in-vehicle terminal 30 is provided on a rear surface 46A of a seat back 46 of the seat 45, i.e., on a surface receiving the back of the passenger. Further, the in-vehicle terminal 30 is provided on a front wall 44 of the vehicle compartment 40 for the passenger in a seat 45 in a front row. Details of the in-vehicle terminal 30 will be described later.

An in-vehicle camera 19 is provided in the vehicle compartment 40. The in-vehicle camera 19 includes an imaging sensor, such as a CMOS sensor or a CCD sensor. For example, the in-vehicle camera 19 is provided on the ceiling of the vehicle compartment 40 to capture the entire vehicle compartment 40. As will be described later, it is determined whether the passenger has transferred to the autonomous vehicle 100 based on the image of the vehicle compartment 40 taken by the in-vehicle camera 19.

Referring to FIG. 4, a passenger entrance 41 is provided on a side wall 47 (first side wall) of the passenger vehicle 10, facing a platform 215 (refer to FIG. 3). In the example shown in FIG. 7, it is assumed that the sidewalk is placed on a left side of the roadway in a case of left-hand traffic. The passenger entrance 41 is provided on the side wall 47 (first side wall) on a left side of the passenger vehicle 10. Referring to FIG. 7, guide signs 41B and 41C are displayed to indicate that it is the entrance for passengers above the passenger entrance 41 on the side wall 47 in the vehicle compartment 40.

A pair of entrance doors 41A are provided at the passenger entrance 41. The entrance doors 41A are, for example, double-leaf sliding doors, each of which slides in the front-back direction of the vehicle so as to open and close. The door control unit 78 (refer to FIG. 9) controls a door motor (not shown) to slide the entrance doors 41A.

Referring to FIGS. 5 and 7, a transfer entrance 42 is provided on a side wall 48 (second side wall) facing the roadway 210 (refer to FIG. 3) and opposite to the side wall 47 (first side wall). In the examples of FIGS. 5 and 7, the transfer entrance 42 is provided on the side wall 48 (second side wall) on a right side of the passenger vehicle 10. The transfer entrance 42 is an entrance through which the passenger of the passenger vehicle 10 transfers to the autonomous vehicle 100 pulling up alongside the passenger vehicle 10.

For example, the passenger entrance 41 and the transfer entrance 42 are so-called non-step entrances, of which floor surfaces are at the same level as a floor surface 43 of the vehicle compartment 40.

A guide sign 42B is displayed to indicate that it is the entrance for transferring above the transfer entrance 42 on the side wall 48 in the vehicle compartment 40. An in-vehicle bulletin board 42C is also provided on the side wall 48 (second side wall). The in-vehicle bulletin board 42C is, for example, a liquid crystal display. As will be described later, the order of transferring to the autonomous vehicle 100 is displayed on the in-vehicle bulletin board 42C.

A pair of transfer doors 42A are provided at the transfer entrance 42. The transfer doors 42A are, for example, double-leaf sliding doors, each of which slides in the front-back direction of the vehicle so as to open and close. The door control unit 78 (refer to FIG. 9) controls a door motor (not shown) to slide the transfer doors 42A.

As described above, the passenger vehicle 10 according to the present embodiment is provided with the passenger entrance 41 for boarding/alighting at the bus stop and the transfer entrance 42 for transferring to the autonomous vehicle 100 at the bus stop. The passenger entrance 41 is installed on a side of the platform 215 of the bus stop, i.e., on the sidewalk side, thus the passengers can smoothly move to the sidewalk. Further, the transfer entrance 42 is installed on the roadway side, thus the autonomous vehicle 100 can quickly travel on the roadway after the passenger boards the vehicle.

Referring to FIGS. 4 and 5, the appearances, i.e., surfaces exposed to the outside, of the passenger vehicle 10 according to the present embodiment are different at the passenger entrance 41 and the transfer entrance 42. For example, a reference mark 42D of checkered pattern is painted on each of both sides of the transfer entrance 42, corresponding to an outer wall surface of the side wall 48. Meanwhile, the reference mark 42D is not painted on the passenger entrance 41.

Since the passenger entrance 41 and the transfer entrance 42 have different appearances, the image recognition for two distinct vehicles is enabled when the autonomous vehicle 100 pulls up alongside the passenger vehicle 10, which will be described later.

In-Vehicle Terminal

Referring to FIGS. 1 and 7, the in-vehicle terminal 30 is a communication terminal device installed in the seat 45 of the passenger vehicle 10. The in-vehicle terminal 30 can be understood as an extension of a stop button provided in a conventional passenger vehicle. The passenger can call the autonomous vehicle 100, which is a driverless taxi, by selecting a bus stop they wish to alight at before arriving at the bus stop.

The in-vehicle terminal 30 may be, for example, a tablet device. As shown in FIG. 1, the in-vehicle terminal 30 includes a bus stop selection unit 31, a vehicle arrangement unit 32, an input unit 33, a display unit 34, and a transceiver unit 35 as functional blocks. The in-vehicle terminal 30 may include a touchscreen in which the functions of the input unit 33 and the display unit 34 are combined.

The bus stop selection unit 31 displays candidates for the passenger to alight at on the touchscreen of the in-vehicle terminal 30, and enables the passenger to select the bus stop they wish to alight at.

The vehicle arrangement unit 32 can make a vehicle dispatch reservation for the autonomous vehicle 100, to which the passenger transfers after alighting from the vehicle at the bus stop. As will be described later, when the passenger sets the bus stop they wish to alight at, the vehicle arrangement unit 32 generates a vehicle arrangement notice and transmits the notice to the management device 50 via the transceiver unit 35. The vehicle arrangement notice includes information on the bus stop that the passenger wishes to alight at, an identification code of the in-vehicle terminal 30, and an identification code of the passenger vehicle 10 on which the in-vehicle terminal 30 is installed.

The transceiver unit 35 has a function of receiving a signal transmitted from the outside to the in-vehicle terminal 30 and a function of transmitting a signal from the in-vehicle terminal 30 to the outside. For example, the transceiver unit 35 transmits the vehicle arrangement notice generated by the vehicle arrangement unit 32 to the management device 50. Further, the transceiver unit 35 receives dispatched vehicle information from the management device 50.

The dispatched vehicle information includes information on the autonomous vehicle 100 reserved for vehicle dispatch and a password for unlocking. The information of the autonomous vehicle 100 includes a license plate number and a vehicle color. This dispatched vehicle information is displayed on a display unit 34 of the in-vehicle terminal 30 to be notified to the passenger who has made the vehicle dispatch reservation.

Management Device

The management device 50 is installed in, for example, a management company that provides operation services of the passenger vehicle 10 and the autonomous vehicle 100. The management device 50 is configured by, for example, a computer (electronic computer). Referring to FIG. 1, the management device 50 is provided with a driverless taxi information storage unit 57, a vehicle dispatch schedule storage unit 58, an in-vehicle terminal storage unit 59, a passenger vehicle information storage unit 60, a service data storage unit 61, and a map storage unit 62, as storage units. Further, the management device 50 includes a clock 51, a map creation unit 52, a transceiver unit 53, a vehicle dispatch reservation setting unit 54, a charge calculation unit 55, and a service management unit 56 as functional units.

The driverless taxi information storage unit 57 stores vehicle information on the autonomous vehicle 100, which is a driverless taxi under the control of the management device 50. This vehicle information includes an identification code (for example, a license plate number), a mileage, a charging state, and the like, of the autonomous vehicle 100.

The vehicle dispatch schedule storage unit 58 stores vehicle dispatch schedule information of a plurality of autonomous vehicles 100 under the control of the management device 50. In the vehicle management system according to the present embodiment, the vehicle dispatch reservation is set in which the bus stop of the passenger vehicle 10 is a place where the passenger boards the autonomous vehicle 100, and the passenger alights from the passenger vehicle 10 to transfer to the autonomous vehicle 100.

FIG. 15 illustrates a vehicle dispatch schedule table. This vehicle dispatch schedule is created for each passenger vehicle 10, which is a bus in operation. In other words, the vehicle dispatch schedule, in which the autonomous vehicle 100 to which the passenger transfers from the passenger vehicle 10 is registered, is created for each passenger vehicle 10 equipped with the in-vehicle terminal 30 by which the vehicle dispatch reservation has been made.

Further, information sheets of passenger vehicle 10 may be grouped according to which bus stop the passenger alights from. For example, information on the vehicle dispatch reservation may be grouped in one sheet, in which the bus stop A1 is set as the bus stop. Information including but not limited to a bus stop code (e.g. A1), an expected arrival time for the passenger vehicle 10, an order, an in-vehicle terminal ID, an autonomous vehicle ID, the license plate number, and the vehicle color, is stored for this sheet. Further, items such as a password for unlocking the autonomous vehicle 100 may be provided in addition to these items.

The order indicates the order in which the vehicle dispatch reservations are set by the in-vehicle terminal 30 in the management device 50, and corresponds to the order in which the autonomous vehicle 100 to which the passenger transfers from the passenger vehicle 10 picks up the passenger, when performing the transfer described later. The in-vehicle terminal ID indicates an identification code of the in-vehicle terminal 30 mounted on the passenger vehicle 10. For example, the seat 45 (refer to FIG. 7) of the passenger vehicle 10 from which the vehicle dispatch reservation is made can be identified based on this identification code. When performing the transfer, which will be described later, the in-vehicle bulletin board 42C displays the vehicle dispatch reservation for the passenger (more accurately, the passenger sitting in which seat) assigned to the autonomous vehicle 100 pulling up alongside the passenger vehicle 10.

The license plate number and the vehicle color are used as information such that the passenger who will transfer to the autonomous vehicle 100 can identify the vehicle on which they are going to ride when performing the transfer described later. For example, these pieces of information are displayed on the in-vehicle bulletin board 42C when performing the transfer described later.

The in-vehicle terminal storage unit 59 stores terminal information of the in-vehicle terminal 30 mounted on the passenger vehicle 10. The terminal information includes but is not limited to an identification code of each in-vehicle terminal 30, an identification code of the passenger vehicle on which the in-vehicle terminal is mounted, and a seat number of the passenger who is operating the in-vehicle terminal 30.

Referring to FIG. 1, vehicle information of the passenger vehicle 10 under the control of the management device 50 is stored in the passenger vehicle information storage unit 60. This vehicle information includes the identification code (for example, a license plate number), a mileage, a charging state, and the like, of the passenger vehicle 10.

The service data storage unit 61 stores a service route and a service schedule for each passenger vehicle 10. For example, the service schedule includes a rated speed, as well as an expected arrival time and an expected departure time for each bus stop.

Dynamic map data, which is map data, is stored in the map storage unit 62. The dynamic map is a three-dimensional map, and for example, a location and a shape (three-dimensional shape) of the roadway are stored therein. The three-dimensional shape of the roadway includes, for example, a gradient and a width. Positions of lanes, pedestrian crosswalks and stop lines drawn on the roadway are also stored in the dynamic map. Locations and shapes (three-dimensional shapes) of the structures, e.g., traffic lights and buildings around the roadway, are further stored in the dynamic map. Furthermore, a location and a shape of a parking lot are also stored in the dynamic map.

For example, the dynamic map uses a geographic coordinate system including latitude and longitude. When the passenger vehicle 10 and the autonomous vehicle 100 are travelling autonomously, the map creation unit 52 extracts dynamic map data from the map storage unit 62.

Further, the map creation unit 52 creates map data including the service route 97 (refer to FIG. 2) of the passenger vehicle 10 and the location information of the bus stops A1 to A12, and transmits the map data to the passenger vehicle 10. The map creation unit 52 creates map data including a travel route from a current location to a destination for the autonomous vehicle 100, and transmits the map data to the autonomous vehicle 100.

The vehicle dispatch reservation setting unit 54 receives the vehicle arrangement notice from the in-vehicle terminal 30, and makes a vehicle dispatch reservation for the autonomous vehicle 100. For example, the vehicle dispatch reservation setting unit 54 acquires the identification code of the passenger vehicle 10 included in the vehicle arrangement notice and information on the bus stop set for the passenger. Further, the vehicle dispatch reservation setting unit 54 acquires the expected arrival time when the passenger vehicle 10 will arrive at the bus stop that the passenger wishes to alight at, from the service data storage unit 61.

Further, the vehicle dispatch reservation setting unit 54 finds the autonomous vehicle 100 for which the vehicle dispatch reservation is not made in a time zone before and after the expected arrival time, for example within 2 hours of the expected arrival time, i.e., a so-called "vacant" autonomous vehicle 100, from the vehicle dispatch reservation information of the vehicle dispatch schedule storage unit 58. Further, the vehicle dispatch reservation setting unit 54 acquires the current locations of a plurality of the vacant autonomous vehicles 100 from the respective positioning units 103 (refer to FIG. 11). The vehicle dispatch reservation setting unit 54 identifies the (vacant) autonomous vehicle 100 closest to the bus stop that the passenger wishes to alight at and sets such a vehicle as a dispatched vehicle.

The vehicle dispatch reservation setting unit 54 transmits the vehicle dispatch reservation information to the autonomous vehicle 100 set as the dispatched vehicle. The vehicle dispatch reservation information includes a waiting place, an expected arrival time when the vehicle will arrive at the waiting place, a seat number of the passenger who has made the vehicle dispatch reservation, and a password for unlocking. As will be described later, the waiting place is set to the parking lot 200 (refer to FIG. 3) installed near the bus stop that the passenger wishes to alight at.

The vehicle dispatch reservation setting unit 54 transmits the data of the vehicle dispatch schedule (refer to FIG. 15) stored in the vehicle dispatch schedule storage unit 58 for each passenger vehicle 10. For example, this vehicle dispatch schedule of the autonomous vehicle 100 is set for each passenger vehicle 10 (in other words, for each bus in operation) from which the passenger transfers to the autonomous vehicle 100. Therefore, the vehicle dispatch reservation setting unit 54 transmits, to the passenger vehicle 10, only the data of the vehicle dispatch schedule of the autonomous vehicle 100 assigned to the passenger vehicle 10.

The charge calculation unit 55 calculates a charge of the autonomous vehicle 100, which is a driverless taxi. For example, the charge calculation unit 55 calculates a fare from the bus stop that a user (i.e. passenger) alights from to the destination.

The service management unit 56 manages a service status of the passenger vehicle 10 which is a passenger-carrying bus. For example, the service management unit 56 transmits the service schedule assigned to each passenger vehicle 10 from the service data storage unit 61 to the passenger vehicle 10.

Autonomous Vehicle

Figure 10:
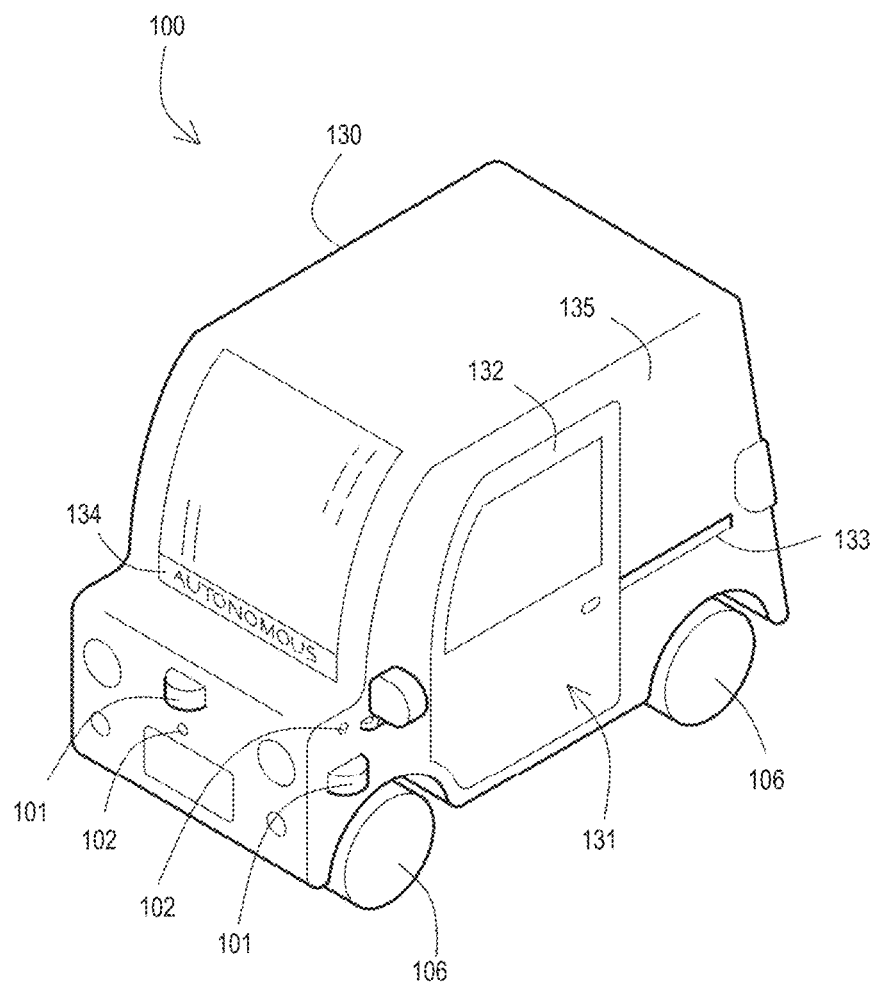
FIG. 10 is a perspective view illustrating a personal mobility as one example of the autonomous vehicle according to the present embodiment.

FIG. 10 is a diagram illustrating the appearance of the autonomous vehicle 100. For example, the autonomous vehicle 100 is also called a personal mobility or an ultra-small mobility, which is a small vehicle for one or two people. Therefore, the autonomous vehicle 100 is relatively smaller than the passenger vehicle 10.

As described above, the autonomous vehicle 100 is used as, for example, a driverless taxi. For example, as will be described later, the autonomous vehicle 100 allows the passenger to transfer from the passenger vehicle 10 to the autonomous vehicle 100. The destination of the autonomous vehicle 100 is set by the passenger transferring from the passenger vehicle 10. Further, map data including a travel route from the current location to the destination is transmitted from the management device 50 to the autonomous vehicle 100. The autonomous vehicle 100 travels autonomously based on this map data. The user, i.e., passenger, transferring from the passenger vehicle 10 is charged based on, for example, how long the user rides on the autonomous vehicle 100.

For example, as shown in FIG. 10, the autonomous vehicle 100 is provided with a sensor unit 101 and a proximity sensor 102 on a front surface, a rear surface, and both side surfaces thereof. The autonomous vehicle 100 also has an outside bulletin board 134 on the front surface thereof. The outside bulletin board 134 is, for example, a liquid crystal display, and can display various messages. For example, the outside bulletin board 134 displays that the vehicle is in the automatic driving state (with a sign of "AUTONOMOUS"), or alternatively, it is vacant or rented.

Moreover, in a case where the user inputs their nickname (e.g. account name) with which they have made the vehicle dispatch reservation, the account name may be displayed on the outside bulletin board 134. A speaker may be mounted on the autonomous vehicle 100 to play, for example, a theme song set by the user when they have made the vehicle dispatch reservation. Such an announcement function of the autonomous vehicle 100 ensures that the user can easily find the autonomous vehicle 100 for which they have made the vehicle dispatch reservation.

A vehicle body 130 of the autonomous vehicle 100 includes an entrance 131 (second entrance). The entrance 131 is provided on a side wall 135 on the same side as the side wall 47 (first side wall) of the passenger vehicle 10 as shown in FIG. 4. In the example of FIG. 10, the entrance 131 is provided on the side wall 135 on a left side of the vehicle body 130.

Figure 14:
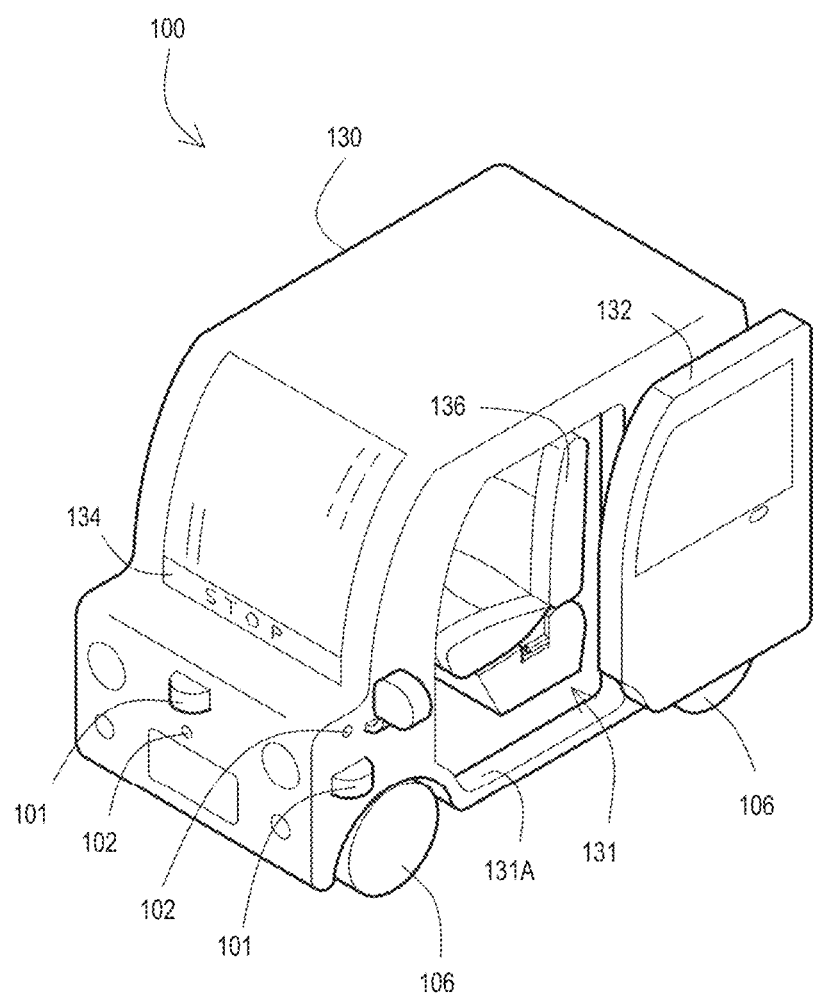
FIG. 14 is a perspective view illustrating one example when a door is opened in the autonomous vehicle according to the present embodiment.

An entrance door 132 is installed at the entrance 131. The entrance door 132 is, for example, a sliding door, which can move forward and backward as guided by a slide rail 133 extending in a front-back direction of the vehicle. For example, FIG. 14 shows one exit in which the entrance door 132 is opened such that a seat 136 in the vehicle can be visually recognized from the outside of the vehicle.

As will be described later, the transfer doors 42A (refer to FIG. 5) of the passenger vehicle 10 and the entrance door 132 of the autonomous vehicle 100 are sliding doors, such that the autonomous vehicle 100 can pull up alongside the passenger vehicle 10 with a shorter gap therebetween as compared with swing doors. Consequently, the passenger can directly transfer from the passenger vehicle 10 to the autonomous vehicle 100, for example, without stepping on the road. Therefore, for example, the passenger can transfer from the passenger vehicle 10 to the autonomous vehicle 100 with a less risk for slipping on a road surface even when the road surface is frozen.

Figure 11:
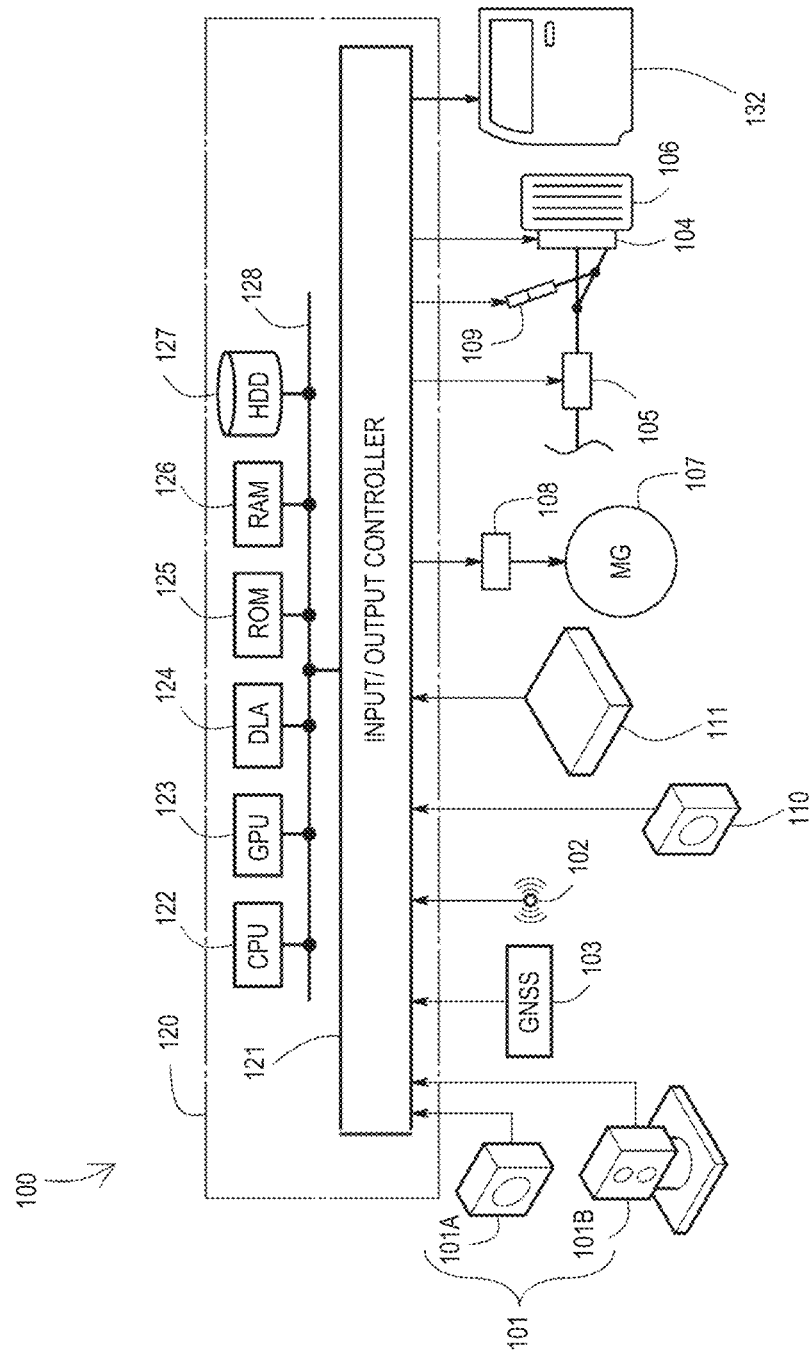
FIG. 11 is a diagram illustrating one example of a hardware configuration of the autonomous vehicle according to the present embodiment.
Figure 12:
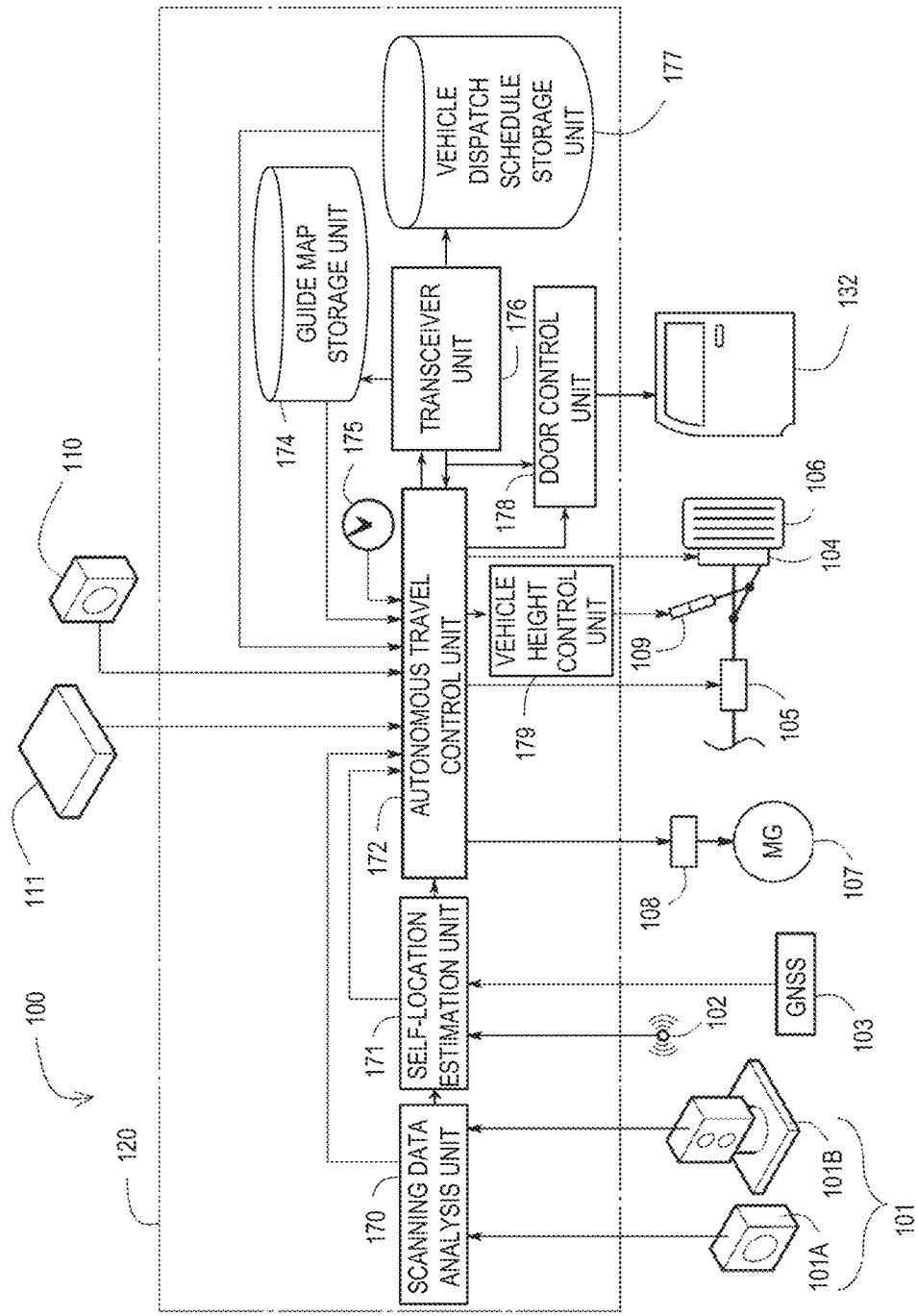
FIG. 12 is a diagram illustrating one example of functional blocks of the autonomous vehicle according to the present embodiment.

FIGS. 11 and 12 are diagrams illustrating an automatic driving mechanism of the autonomous vehicle 100. This mechanism includes a sensor unit 101, a proximity sensor 102, a positioning unit 103, a braking mechanism 104, a steering mechanism 105, a rotating electrical machine 107, an inverter 108, an in-vehicle camera 110, and a control unit 120. These devices have configurations equivalent to the sensor unit 11, the proximity sensor 12, the positioning unit 13, the braking mechanism 14, the steering mechanism 15, the rotating electrical machine 17, the inverter 18, the in-vehicle camera 19, and the control unit 20, as shown in FIG. 8, thus detailed descriptions thereof will be omitted.

Differing from FIG. 8, FIG. 11 shows an air suspension mechanism 109. The air suspension mechanism is already well known and thus detailed description thereof will be omitted, however the air suspension mechanism can adjust a height of the vehicle body 130 by supplying air to and exhausting air from air spring connecting wheels 106 and the vehicle body 130 (refer to FIG. 10). This vehicle height adjustment is called "leveling".

Figure 13:
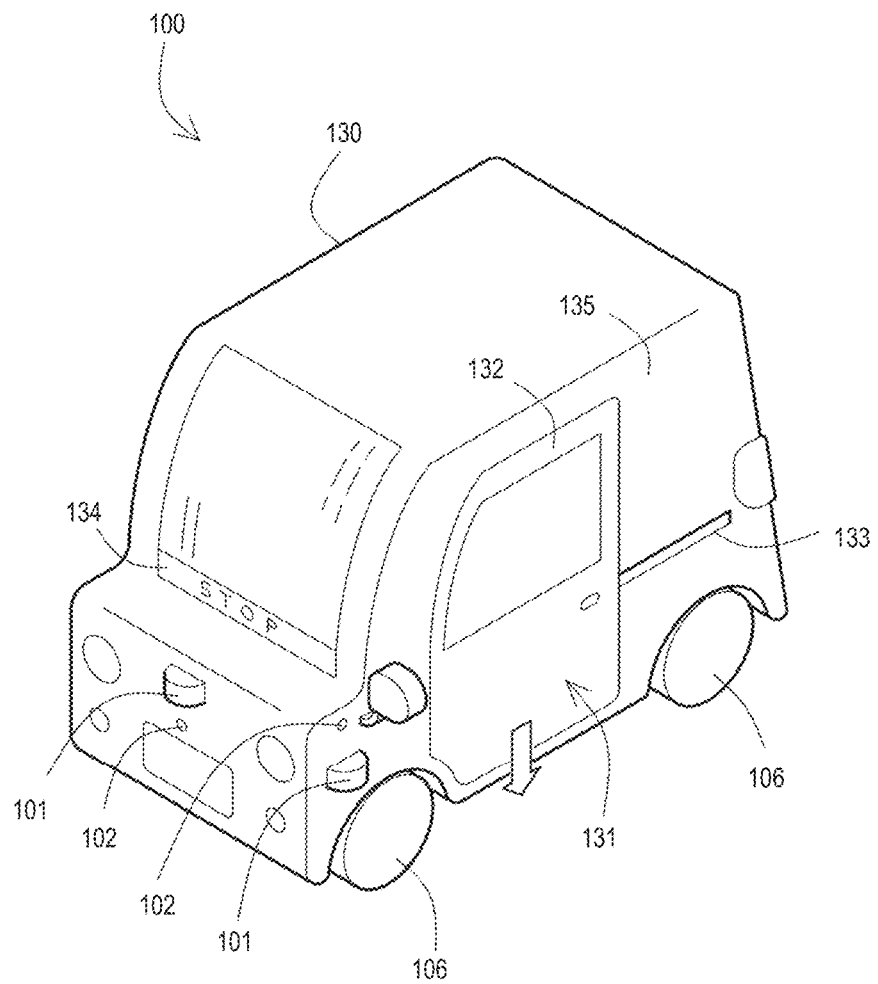
FIG. 13 is a perspective view illustrating a leveling function of the autonomous vehicle according to the present embodiment.

For example, as will be described later, when the passenger transfers from the passenger vehicle 10 to the autonomous vehicle 100, the vehicle body 130 is lowered as shown in FIG. 13. Specifically, the vehicle height adjustment (leveling) is carried out such that a height of a floor surface 131A (refer to FIG. 14) of the entrance 131 (second entrance) is the same level as the floor surface 43 of the transfer entrance 42 (first entrance; refer to FIG. 7) of the passenger vehicle 10.

Further, again differing from FIG. 8, an authenticator 111 is shown in FIG. 11. The authenticator 111 may be, for example, a tablet including a touchscreen in which an input unit and a display unit are integrated. For example, the password for unlocking included in the vehicle dispatch reservation information is input by the passenger to the authenticator 111.

Referring to FIGS. 11 and 12, a program for executing automatic driving control of the autonomous vehicle 100 is stored in at least one of an ROM 125 and a hard disk drive 127, which are the storage devices. When the program is executed by, for example, a CPU 122 of the control unit 120, functional blocks are generated in the control unit 120 as shown in FIG. 12. That is, the control unit 120 includes a scanning data analysis unit 170, a self-location estimation unit 171, an autonomous travel control unit 172, a clock 175, and a transceiver unit 176, as the functional blocks. Since these functional units have the same features as the functional units of the passenger vehicle 10 shown in FIG. 9, detailed descriptions thereof will be omitted.

The scanning data analysis unit 170 has a function of recognizing the passenger vehicle 10 from a captured image of the outside camera 101A, and also a function of recognizing the transfer entrance 42 of the passenger vehicle 10, in connection with the autonomous vehicle 100 pulling up alongside the passenger vehicle 10, as will be described later.

For example, a neural network that has been trained by training data, including an appearance image of the passenger vehicle 10 as input data and a class "passenger vehicle" as an output value, is implemented in the scanning data analysis unit 170.

Further, a neural network for recognizing the entrance that has been trained by training data, including an appearance image of the transfer entrance 42 (refer to FIG. 5) as input data and a class "transfer entrance" as an output value, is implemented in the scanning data analysis unit 170. For the neural network for recognizing the entrance, the training data may also have data including an appearance image of the passenger entrance 41 (refer to FIG. 4) as input data and a class "passenger entrance" as an output value. As the neural network for recognizing the entrance is learned by the training data, the neural network can distinguish the passenger entrance 41 and the transfer entrance 42 in the recognition.

The autonomous vehicle 100 includes a guide map storage unit 174, a vehicle dispatch schedule storage unit 177, a door control unit 178, and a vehicle height control unit 179. The guide map storage unit 174 contains a map from a location at which a vehicle dispatch command has been received to a waiting place near the bus stop that the passenger wishes to alight at, a map from the waiting place to such a bus stop, and a map from such a bus stop to the destination. Those pieces of map data are created by the map creation unit 52 of the management device 50 (refer to FIG. 1) and transmitted to the autonomous vehicle 100.

Referring to FIG. 12, the vehicle dispatch schedule storage unit 177 stores, for example, the expected arrival time when the vehicle will arrive at the waiting place, the password for unlocking, and the seat number of the passenger who has made the vehicle dispatch reservation.

The door control unit 178 controls the opening and closing of the entrance door 132 with drive control of, for example, a door motor (not shown). Further, the vehicle height control unit 179 controls the vehicle height using the air suspension mechanism 109 with drive control of, for example, a compressor (not shown).

Transfer Process

Figure 16:
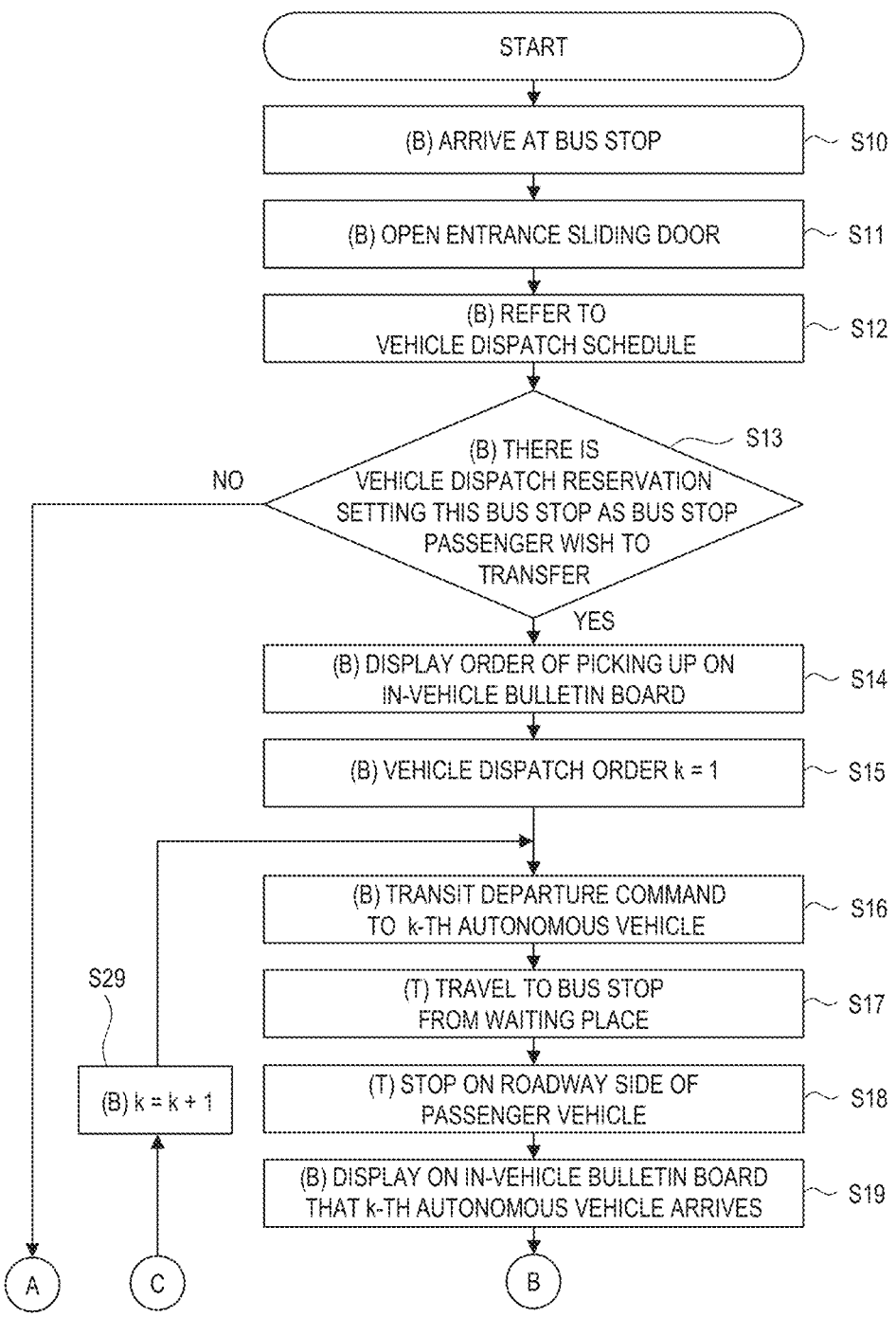
FIG. 16 is a diagram illustrating a transfer flow (1/2) when transferring from the passenger vehicle to the autonomous vehicle.
Figure 17:
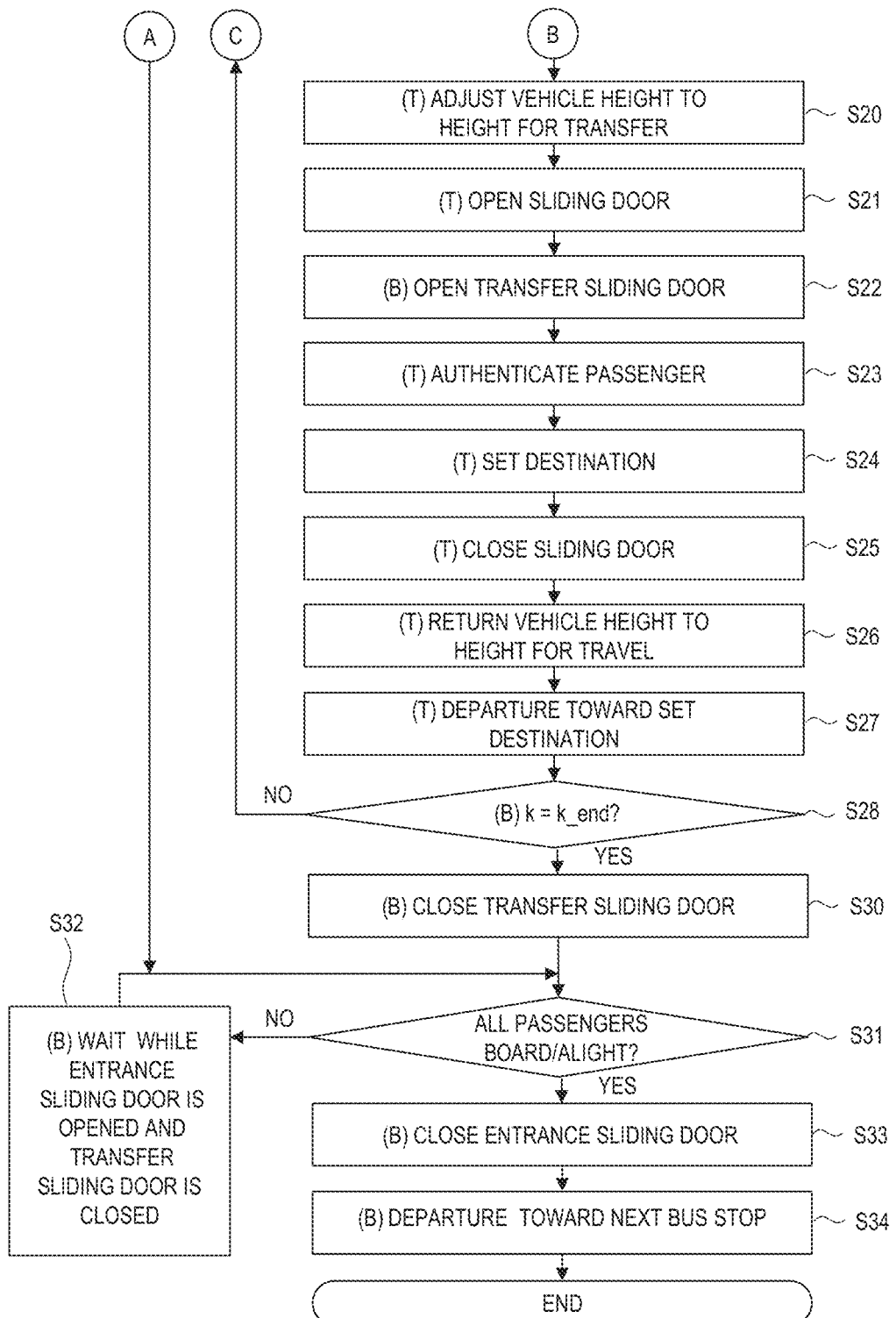
FIG. 17 is a diagram illustrating a transfer flow (2/2) when transferring from the passenger vehicle to the autonomous vehicle.

FIGS. 16 and 17 are diagrams illustrating one example of a transfer flow implemented by the vehicle transfer system according to the present embodiment. The vehicle transfer system includes the passenger vehicle 10 and the autonomous vehicle 100. A subject who executes each step is displayed in this transfer flow. That is, (B) is a step executed by the passenger vehicle 10 which is a passenger-carrying bus, and (T) is a step executed by the autonomous vehicle 100 which is a driverless taxi. Further, FIGS. 18 to 20 respectively show plan views of an area around the bus stop A5 when transferring.

Figure 18:
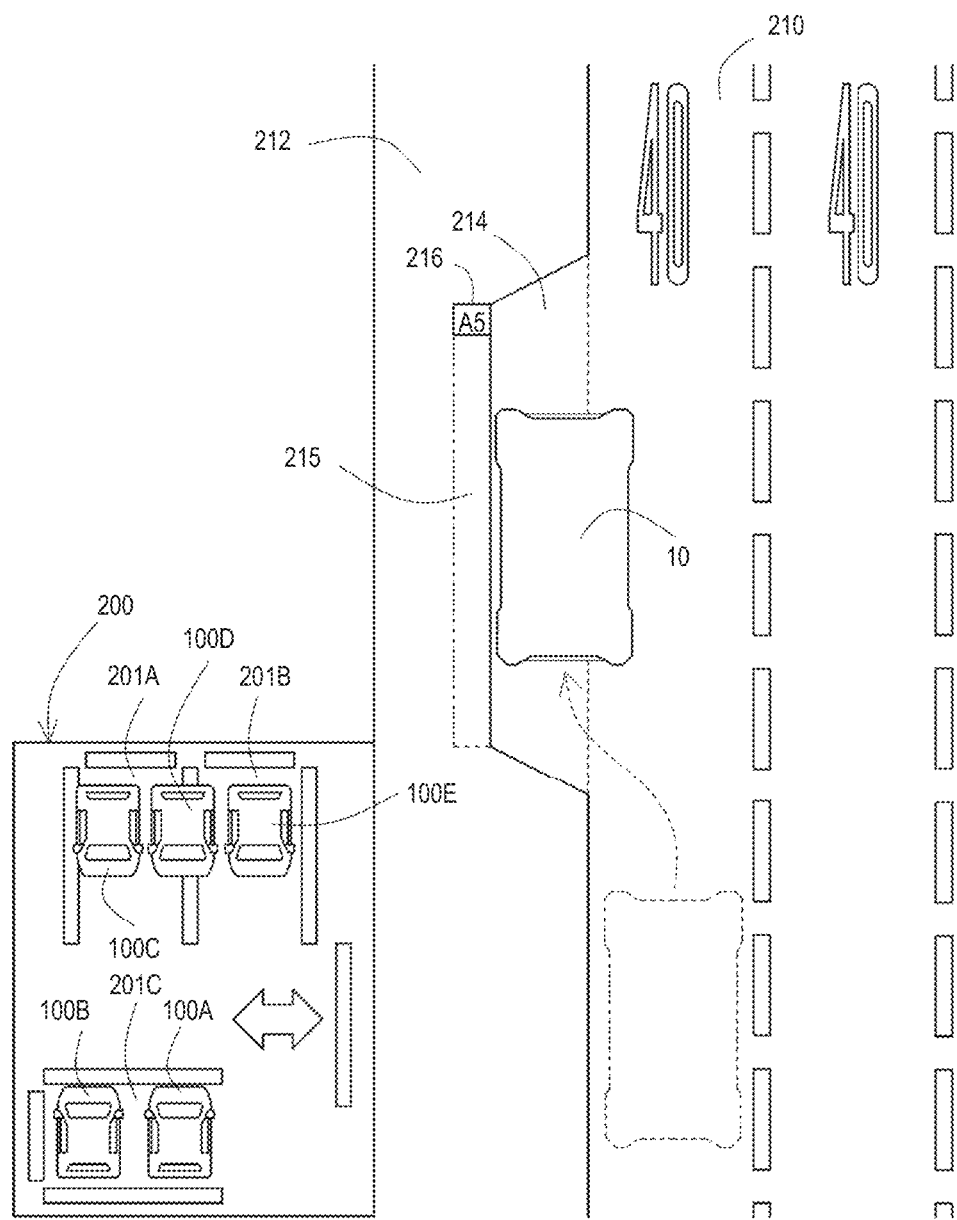
FIG. 18 is a diagram illustrating a transfer process (1/3) when transferring from the passenger vehicle to the autonomous vehicle.

Referring to FIG. 18, the passenger vehicle 10 enters the stop spot 214 from the roadway 210 to stop at the bus stop A5. Further, the sign 216 is recognized by the sensor unit 11 (refer to FIG. 9) and the scanning data analysis unit 70 of the passenger vehicle 10. The autonomous travel control unit 72 executes a correct arrival control targeting the sign 216.

When the passenger vehicle 10 pulls up alongside the platform 215 in the stop spot 214 (S10 in FIG. 16), the door control unit 78 (refer to FIG. 9) opens the entrance doors 41A of the passenger entrance 41 (S11).

Further, the vehicle dispatch control unit 77 refers to the vehicle dispatch schedule from the vehicle dispatch schedule storage unit 76 (S12), and confirms whether the vehicle dispatch reservation is set for the bus stop A5 as the bus stop that the passenger wishes to alight at (S13).

In a case where the vehicle dispatch reservation is not set for the bus stop A5 as the bus stop that the passenger wishes to alight at, the autonomous travel control unit 72 determines whether all passengers boarded/alighted from the vehicle from captured images obtained by the in-vehicle camera 19 and the outside camera 11A (S31). In a case where the passengers are still boarding/alighting from the vehicle, the door control unit 78 leaves the entrance doors 41A of the passenger entrance 41 open. Further, the door control unit 78 keeps the transfer doors 42A of the transfer entrance 42 closed (S32).

In a case where all passengers have boarded/alighted from vehicle in step S31, the door control unit 78 closes the entrance doors 41A of the passenger entrance 41 (S33). Further, the autonomous travel control unit 72 departs toward the next bus stop A6 (S34).

Returning to step S13, in a case where the vehicle dispatch reservation is set for the bus stop A5 as the bus stop that the passenger wishes to alight at, the vehicle dispatch control unit 77 acquires the seat number associated with the in-vehicle terminal ID based on the vehicle dispatch schedule (refer to FIG. 15) stored in the vehicle dispatch schedule storage unit 76. Further the vehicle dispatch control unit 77 sequentially displays the acquired seat numbers on the in-vehicle bulletin board 42C (refer to FIG. 7) in the order of the order (the order of picking up the passengers) (S14).

Figure 19:
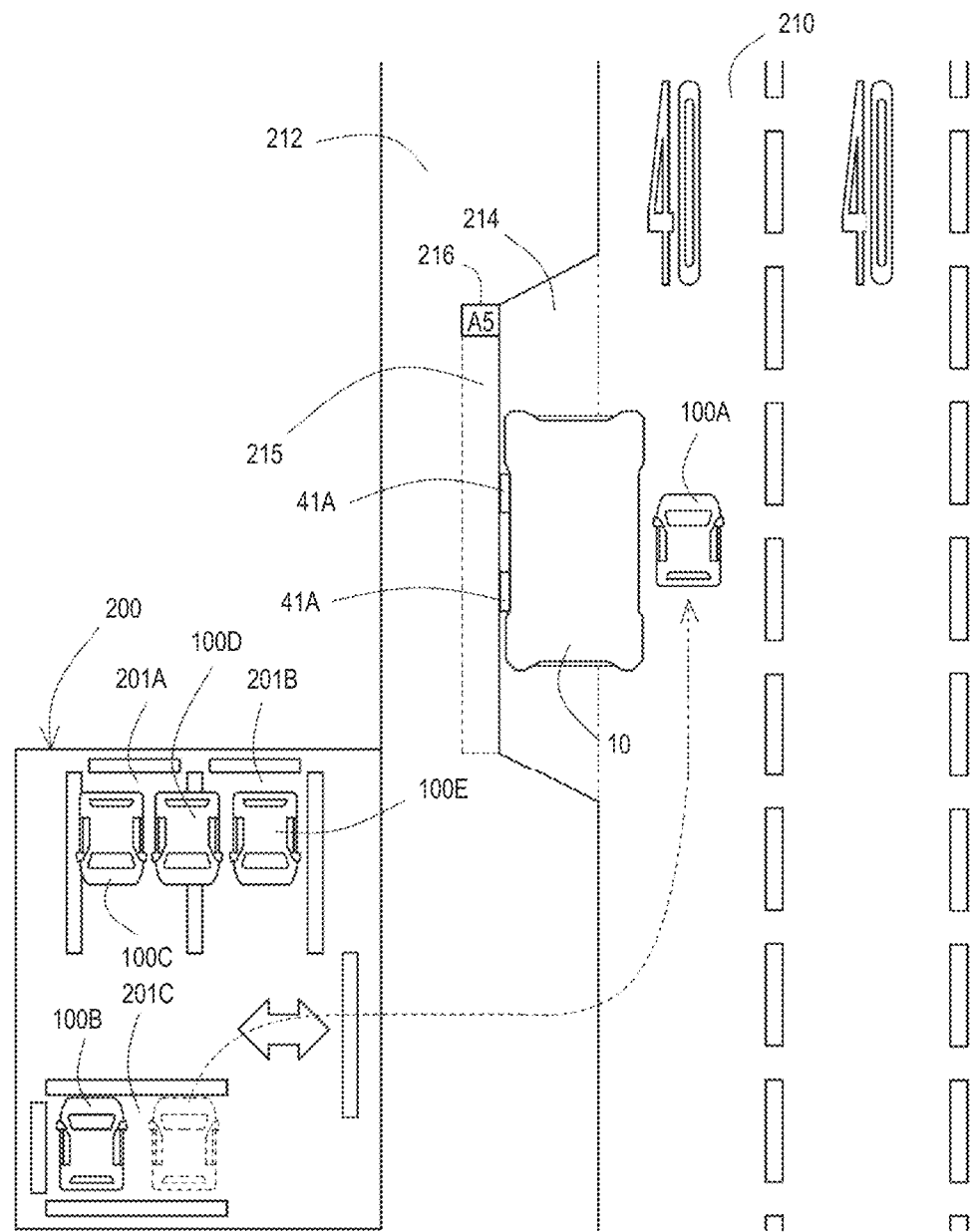
FIG. 19 is a diagram illustrating a transfer process (2/3) when transferring from the passenger vehicle to the autonomous vehicle.

Further, the vehicle dispatch control unit 77 sets a count k to an initial value 1 (S15). The vehicle dispatch control unit 77 transmits a departure command to the autonomous vehicle 100 reserved for the vehicle dispatch at the k-th count (S16). Receiving the command, as shown in FIG. 19, the autonomous vehicle 100 (a autonomous vehicle 100A in the example of FIG. 19) waiting in the parking lot 200 autonomously travels from the parking lot 200 toward the passenger vehicle 10 (S17).

While traveling autonomously, the scanning data analysis unit 170 (refer to FIG. 12) performs image recognition on the captured images obtained by the outside camera 101A. When the scanning data analysis unit 170 recognizes an image area of the transfer entrance 42 of the passenger vehicle 10 in this image recognition, the autonomous travel control unit 172 executes the correct arrival control for pulling up alongside the passenger vehicle 10.

"Pulling up alongside the passenger vehicle 10" means that the autonomous vehicle 100 (small vehicle) is stopped such that the entrance 131 (second entrance) of the autonomous vehicle 100 is placed next to the transfer entrance 42 (first entrance) of the passenger vehicle 10 (large vehicle) when the passenger vehicle 10 is stopped. An offset distance between the transfer entrance 42, recognized by the scanning data analysis unit 170 from the images, and the entrance 131 of the autonomous vehicle 100 is measured by the LiDAR unit 101B which is the ranging unit.

The autonomous travel control unit 172 having a function of the steering control unit controls the steering mechanism 105 such that the offset distance falls within a predetermined proximity region (for example, 50 cm distance). Consequently, the autonomous vehicle 100 is stopped on the roadway side of the passenger vehicle 10 (S18), and the transfer entrance 42 and the entrance 131 are arranged so as to face each other.

When the autonomous vehicle 100 pulls up alongside the passenger vehicle 10, the autonomous travel control unit 172 transmits an arrival notice to the vehicle dispatch control unit 77 of the passenger vehicle 10. The vehicle dispatch control unit 77 displays a message that the autonomous vehicle at the k-th count has arrived on the in-vehicle bulletin board 42C (S19). For example, the seat number corresponding to the count k is displayed.

On the other hand, the autonomous vehicle 100 performs the leveling by the vehicle height control unit 179. The vehicle height control unit 179 controls the air suspension mechanism 109 to change the vehicle height of the autonomous vehicle 100 from a height for travel to a height for transfer (S20).

Referring to FIGS. 12 to 14, the vehicle height control unit 179 controls the air pressure of the air suspension mechanism 109 such the floor surface 131A of the entrance 131 is at the same level as the floor surface of the transfer entrance 42 of the passenger vehicle 10, for example, the floor surface 43 (refer to FIG. 7).

Figure 20:
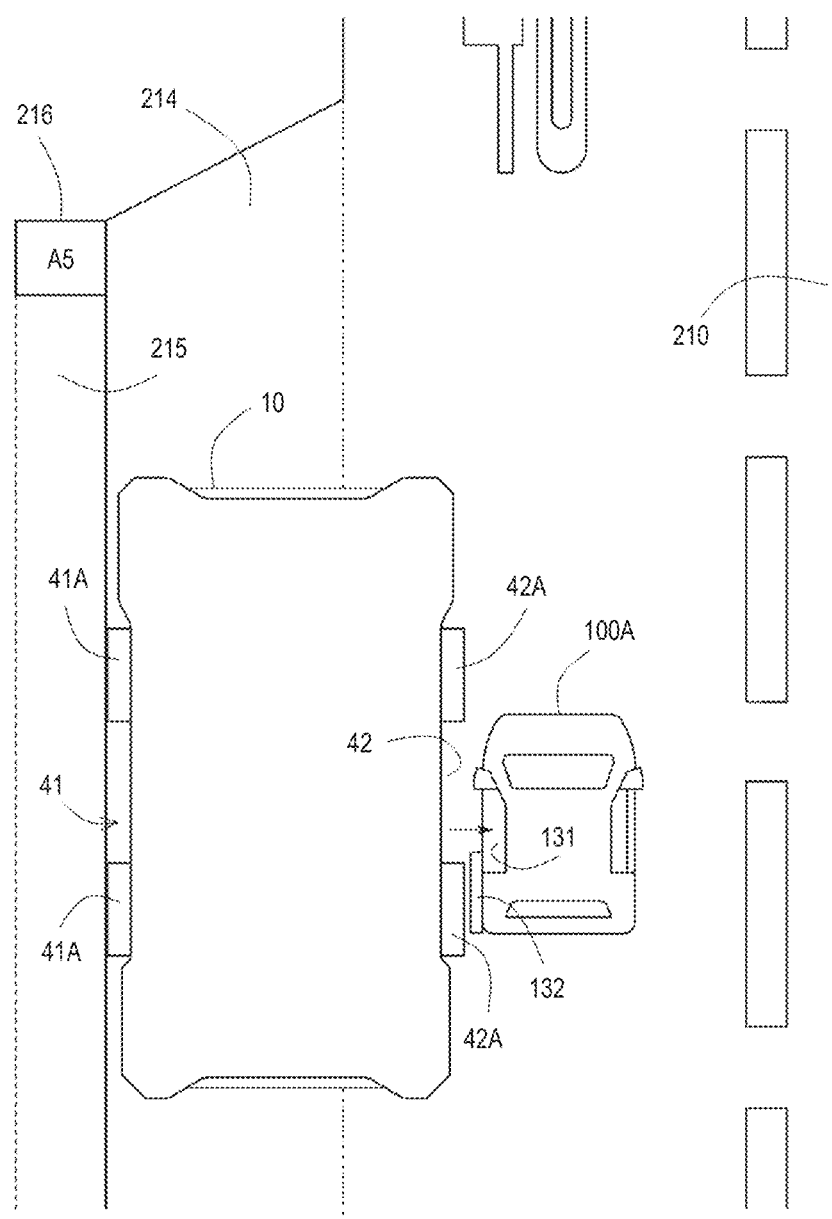
FIG. 20 is a diagram illustrating a transfer process (3/3) when transferring from the passenger vehicle to the autonomous vehicle.

When the leveling to the height for transfer is completed, as shown in FIG. 20, the door control unit 178 drives the door motor (not shown) to open the closed entrance door 132 (S21). Further, the door control unit 78 of the passenger vehicle 10 also releases a notice that the leveling is done from the autonomous vehicle 100 and drives the door motor (not shown) to open the closed transfer doors 42A (S22).

Opening the entrance door 132 and the transfer doors 42A, the passenger can transfer from the passenger vehicle 10 to the autonomous vehicle 100. As described above, the autonomous vehicle 100 pulls up alongside the passenger vehicle 10, and the entrance 131 directly faces the transfer entrance 42. Furthermore, floor surface heights of the entrances are adjusted at the same level by leveling. The doors of the respective entrances are configured by the sliding doors, thus the offset distance between the entrance 131 and the transfer entrance 42 is shorter than that of the swing doors.

With these configurations, the passenger can directly transfer from the passenger vehicle 10 to the autonomous vehicle 100 without stepping on the road when performing the transfer. For example, the passenger can transfer with less of a risk of slipping on the road surface even when the road surface is frozen as they do not have to make contact with the road.

The passenger boards the autonomous vehicle 100 and inputs the password for unlocking into the authenticator 111 (refer to FIG. 12). If the password is correct, the passenger is authenticated by the authenticator 111 (S23), and the automatic driving is available now. For example, in a case where the authenticator 111 is configured by a tablet, a screen for inputting the destination is shown on a touch-screen display.

When the passenger sets the destination (S24), destination information and the current location information are transmitted from the transceiver unit 176 to the management device 50 (refer to FIG. 1). The map creation unit 52 of the management device 50 searches for a travel route from the current location as a departure point to the destination, creates map data including the travel route, and transmits the map data to the autonomous vehicle 100.

When the destination is set, the door control unit 178 of the autonomous vehicle 100 closes the entrance door 132 (S25). The vehicle height control unit 179 controls the air suspension mechanism 109 to return the height of the vehicle body 130 to the height for travel (S26). When a notice that the entrance door 132 is closed is received from the door control unit 178 and it is confirmed that the passenger has boarded the vehicle by the in-vehicle camera 110, the autonomous travel control unit 172 initiates the automatic driving toward the destination along the travel route (S27).

When the autonomous vehicle 100 departs, the vehicle dispatch control unit 77 of the passenger vehicle 10 confirms whether the counter k of the vehicle dispatch reservation is a final value k_end (S28). If the count k has not yet reached the final value k_end, the vehicle dispatch control unit 77 increments the count k (S29) and the process returns to step S16.

On the other hand, when the count k of the vehicle dispatch reservation is the final value k_end, the door control unit 78 closes the transfer doors 42A (S30). The door control unit 78 determines whether all passengers have boarded/alighted from the vehicle at the platform 215 based on images around the entrance doors 41A by the in-vehicle camera 19 (S31). In a case where the passengers are still boarding/alighting from the vehicle at the platform 215, the door control unit 78 waits for a predetermined time while leaving the entrance doors 41A open and keeping the transfer doors 42A closed, and the process returns to step S31.

On the other hand, in a case where all passengers have boarded/alighted from the vehicle at the platform 215 in step S31, the door control unit 78 closes the entrance doors 41A (S33). Further, the autonomous travel control unit 72 controls the passenger vehicle 10 to depart toward the next bus stop (S34).

Another Example of a Bus Stop

Figure 21:
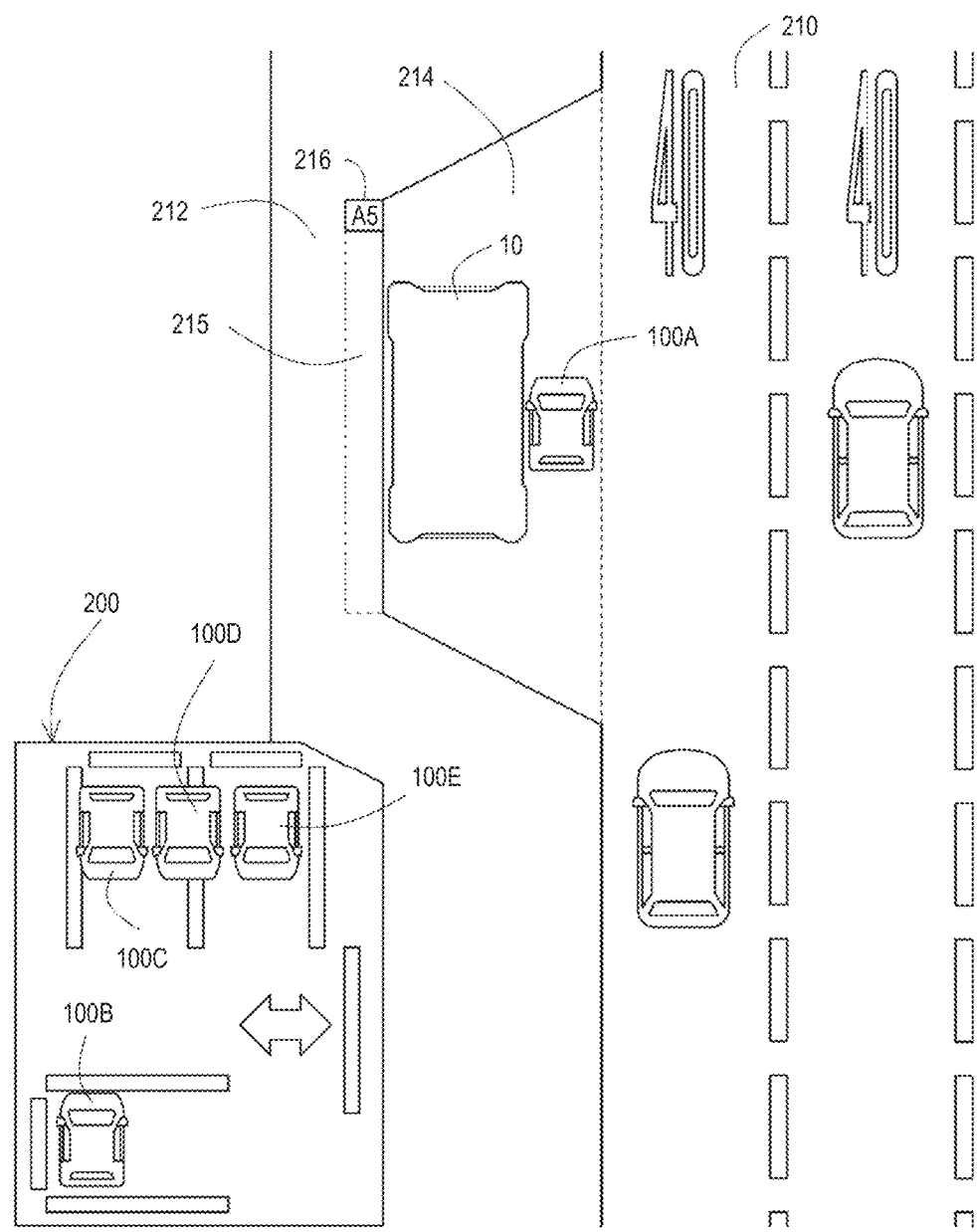
FIG. 21 is a diagram illustrating another example of the bus stop which is a bus turnout.

In the examples of FIG. 3 and FIGS. 18 to 20, a width of the stop spot 214 is substantially the same as the vehicle width of the passenger vehicle 10, but the stop spot 214 may be wider. For example, as shown in FIG. 21, the width of the stop spot 214 may be defined to be equal to the sum of vehicle widths of the passenger vehicle 10 and the autonomous vehicle 100, in consideration of when the autonomous vehicle 100 pulls up alongside the passenger vehicle 10.

Still Another Example of a Bus Stop

Figure 22:
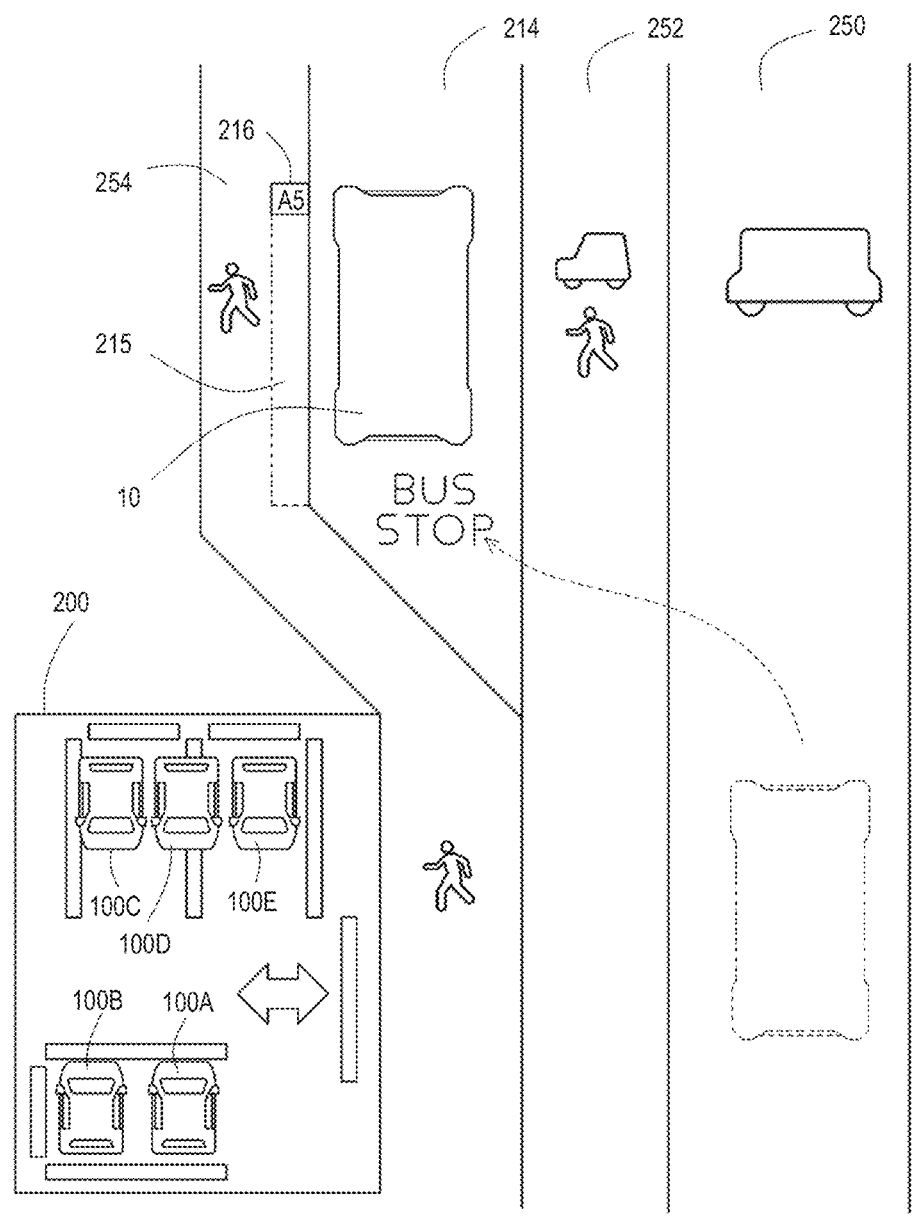
FIG. 22 is a diagram illustrating a still another example of the bus stop.

FIG. 22 shows still another example of the bus stop. In this example, three kinds of roads are shown. That is, three kinds of roads are arranged in parallel, a roadway 250 on which the passenger vehicle 10, a relatively large vehicle, travels, a hybrid road 252 on which the autonomous vehicle 100, a relatively small vehicle, can travel and pedestrians can walk, and a sidewalk 254.

In such a case, the stop spot 214 is installed between the hybrid road 252 and the sidewalk 254 such that the passenger vehicle 10 is not stopped on the hybrid road 252 and the sidewalk 254. The passenger vehicle 10 traveling on the roadway 250 crosses the hybrid road 252, enters the stop spot 214, and stops next to the platform 215. The subsequent processes are the same as in FIGS. 16 to 20.

What is claimed is:

1. An autonomous vehicle to which passengers transfer from a large vehicle relatively larger than the autonomous vehicle, the autonomous vehicle comprising:
   a processor configured to
      in response to the large vehicle being stopped, cause the autonomous vehicle to pull up alongside the large vehicle to place a second entrance of the autonomous vehicle next to a first entrance of the large vehicle; and
   a sensor configured to measure an offset distance between the second entrance of the autonomous vehicle and the first entrance of the large vehicle,
   wherein the processor is configured to
      recognize the first entrance of the large vehicle by implementing a neural network that has been trained by training data to distinguish the first entrance of the large vehicle, and
      execute a correct arrival control for pulling up the autonomous vehicle alongside the large vehicle by controlling steering of the autonomous vehicle to cause the offset distance to fall within a predetermined proximity region.

2. The autonomous vehicle according to claim 1, further comprising:
   a suspension mechanism configured to adjust a vehicle height of the autonomous vehicle;

wherein
the suspension mechanism includes an air compressor connecting a wheel of the autonomous vehicle and a vehicle body of the autonomous vehicle, and
the processor is configured to
control the air compressor by supplying air to and exhausting the air from the air compressor, and
in response to the autonomous vehicle pulling up alongside the large vehicle, control the air compressor to adjust a floor surface of the second entrance to be at a same level as a floor surface of the first entrance.

3. A passenger vehicle configured to travel on a predetermined service route and allow passengers to board and alight from the passenger vehicle at a bus stop installed on the predetermined service route, the passenger vehicle comprising:
a passenger entrance provided on a first side wall facing a platform provided at the bus stop;
a transfer entrance which is provided on a second side wall facing a roadway and opposite to the first side wall, and through which the passengers transfer to an autonomous vehicle when the autonomous vehicle pulls up alongside the passenger vehicle; and
a processor configured to
acquire a captured image and three-dimensional point cloud data,
perform image recognition on the captured image,
execute clustering to divide the three-dimensional point cloud data into a plurality of clusters,
create surrounding data by superimposing coordinates of the captured image subject to the image recognition and the plurality of clusters of the three-dimensional point cloud data, and
based on the surrounding data, perform travel control of the passenger vehicle.

4. The passenger vehicle according to claim 3, further comprising:
a sensor configured to measure a distance between the passenger vehicle and an object around the passenger vehicle, the sensor including
an emitter configured to irradiate an infrared laser beam toward an outside of the passenger vehicle,
a receiver configured to receive light reflected from irradiating the infrared laser beam, and
a motor configured to
rotate the emitter and the receiver, and
scan a surrounding of the passenger vehicle, wherein
the processor is configured to acquire the three-dimensional point cloud data from the sensor.

5. The passenger vehicle according to claim 3, further comprising:
a camera in an interior of the passenger vehicle, wherein the processor is configured to determine whether a passenger of the passengers has transferred to the autonomous vehicle based on a further image taken by the camera.

6. The passenger vehicle according to claim 3, wherein an appearance of the first side wall provided with the passenger entrance is visible to other vehicles and different from that of the second side wall provided with the transfer entrance.

7. A vehicle transfer system comprising:
a passenger vehicle configured to
travel on a predetermined service route, and
allow passengers to board and alight from the passenger vehicle at a bus stop installed on the predetermined service route; and
an autonomous vehicle to which the passengers transfer from the passenger vehicle,
wherein the passenger vehicle includes:
a passenger entrance provided on a first side wall facing a platform provided at the bus stop;
a transfer entrance which is provided on a second side wall facing a roadway and opposite to the first side wall, and through which the passengers transfer to the autonomous vehicle; and
a first processor configured to
acquire a captured image and three-dimensional point cloud data,
perform image recognition on the captured image,
execute clustering to divide the three-dimensional point cloud data into a plurality of clusters,
create surrounding data by superimposing coordinates of the captured image subject to the image recognition and the plurality of clusters of the three-dimensional point cloud data, and
based on the surrounding data, perform travel control of the passenger vehicle, and
wherein the autonomous vehicle includes:
an entrance provided on a side wall on a same side as the first side wall of the passenger vehicle;
a second processor configured to
in response to the passenger vehicle being stopped at the bus stop, cause the autonomous vehicle to pull up alongside the passenger vehicle to place the entrance of the autonomous vehicle next to the transfer entrance of the passenger vehicle; and
a sensor configured to measure an offset distance between the entrance of the autonomous vehicle and the transfer entrance of the passenger vehicle, and
the second processor is configured to
recognize the transfer entrance of the passenger vehicle by implementing a neural network that has been trained by training data to distinguish the passenger entrance and the transfer entrance of the passenger vehicle, and
execute a correct arrival control for pulling up the autonomous vehicle alongside the passenger vehicle by controlling steering of the autonomous vehicle to cause the offset distance to fall within a predetermined proximity region.

8. The vehicle transfer system according to claim 7, wherein
the passenger vehicle further comprises a first sliding door installed at the transfer entrance, the first sliding door configured to move forward and backward in a front-back direction of the passenger vehicle, the passenger vehicle, and
the autonomous vehicle further comprises a second sliding door installed at the entrance of the autonomous vehicle, the second sliding door configured to move forward and backward in a front-back direction of the autonomous vehicle.

9. The vehicle transfer system according to claim 7, wherein
the autonomous vehicle further includes a suspension mechanism configured to adjust a vehicle height;
wherein the suspension mechanism includes an air compressor connecting a wheel of the autonomous vehicle and a vehicle body of the autonomous vehicle, and
the second processor is configured to control the air compressor by supplying air to and exhausting the air from the air compressor, and in response to the autonomous vehicle pulling up alongside the passenger vehicle, control the air compressor to adjust a floor surface of the entrance of the autonomous vehicle to be at a same level as a floor surface of the transfer entrance of the passenger vehicle.

10. The vehicle transfer system according to claim 8, wherein the passenger vehicle further comprises a sensor configured to measure a distance between the passenger vehicle and an object around the passenger vehicle, the sensor including an emitter configured to irradiate an infrared laser beam toward an outside of the passenger vehicle, a receiver configured to receive light reflected from irradiating the infrared laser beam, and a motor configured to
rotate the emitter and the receiver, and
scan a surrounding of the passenger vehicle, and the first processor is configured to acquire the three-dimensional point cloud data from the sensor.

11. The vehicle transfer system according to claim 10, further comprising:

a camera in an interior of the passenger vehicle, wherein the first processor is configured to determine whether a passenger of the passengers has transferred to the autonomous vehicle based on a further image taken by the camera.

12. The vehicle transfer system according to claim 11, wherein an appearance of the first side wall provided with the passenger entrance is visible to other vehicles and different from that of the second side wall provided with the transfer entrance.

13. The vehicle transfer system according to claim 12, wherein the training data includes the appearance of the first side wall provided with the passenger entrance as input data and a class "passenger entrance" as an output value.

\* \* \* \* \*